(12) United States Patent  (10) Patent No.: US 8,427,679 B2
Fujioka  (45) Date of Patent: Apr. 23, 2013

(54) IMAGE COMMUNICATION APPARATUS, IMAGE COMMUNICATION SYSTEM, AND CONTROL PROGRAM FOR IMAGE COMMUNICATION

(75) Inventor: Susumu Fujioka, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 612 days.

(21) Appl. No.: 12/656,551

(22) Filed: Feb. 3, 2010

(65) Prior Publication Data
US 2010/0195123 A1 Aug. 5, 2010

(30) Foreign Application Priority Data

Feb. 4, 2009 (JP) ................................ 2009-023606
Dec. 15, 2009 (JP) ................................ 2009-284529

(51) Int. Cl.
*G06F 3/12* (2006.01)
*H04N 1/60* (2006.01)

(52) U.S. Cl.
USPC ............................ 358/1.15; 358/1.9; 358/1.11

(58) Field of Classification Search .................. None
See application file for complete search history.

(56) References Cited

U.S. PATENT DOCUMENTS 4,630,129 A * 12/1986 Hayashi et al. ............... 358/296
2010/0033756 A1* 2/2010 Fujioka ......................... 358/1.15

FOREIGN PATENT DOCUMENTS

| JP | 05304576 A | * 11/1993 |
| JP | 2000-151957 | 5/2000 |
| JP | 2000-174973 | 6/2000 |
| JP | 2006-262024 | 9/2004 |
| JP | 2005-321567 | 11/2005 |

* cited by examiner

*Primary Examiner* — Dov Popovici
(74) *Attorney, Agent, or Firm* — Harness, Dickey & Pierce, P.L.C.

(57) ABSTRACT

An image communication apparatus that includes an image-data receiving unit that receives image data, a storing unit that stores therein the image data received by the image-data receiving unit, and an output unit that outputs the image data stored in the storing unit, the image communication apparatus includes a scanning unit that scans the image data output by the output unit; a difference extracting unit that extracts a difference between the image data scanned by the scanning unit and the image data stored in the storing unit; a difference determining unit that determines whether the difference extracted by the difference extracting unit satisfies a predetermined condition based on condition information obtained together with the image data; and a control unit that controls so that a message is transmitted to a transmission source of the image data based on a result determined by the difference determining unit.

18 Claims, 22 Drawing Sheets

| CHARACTER | FIRST GROUP | SECOND GROUP | THIRD GROUP |
|---|---|---|---|
| A | Δ, ⋯ | 4, ⋯ | 山, 日, ⋯ |
| B | P, R, 8, ⋯ | D, E, ⋯ | F, 日, 日, ⋯ |
| C | G, O, 0, ⋯ | D, Q, ⋯ | 6, ⋯ |
| ⋮ | | | |
| 日 | E, 日, ⋯ | B, F, 田, ⋯ | A, 8, 旦, ⋯ |
| 日 | E, 日, ⋯ | B, F, 田, ⋯ | A, 8, 旦, ⋯ |
| ⋮ | | | |

この資料は新製品の機能に関するものである。
機能1： ○○○○○○○○○○
機能2： ○○○○○○○
機能3： ○○○○○○○○○○○○○
機能4： ○○○○○○○○○

IMAGE COMMUNICATION APPARATUS, IMAGE COMMUNICATION SYSTEM, AND CONTROL PROGRAM FOR IMAGE COMMUNICATION

CROSS-REFERENCE TO RELATED APPLICATIONS

The present application claims priority to and incorporates by reference the entire contents of Japanese Patent Application No. 2009-023606 filed in Japan on Feb. 4, 2009 and Japanese Patent Application No. 2009-284529 filed in Japan on Dec. 15, 2009.

BACKGROUND OF THE INVENTION

1. Field of the Invention

The present invention relates to an image communication apparatus, an image communication system, and a control program, and particularly relates to a control of notifying of a printed result of image data received via a network communication.

2. Description of the Related Art

An image communication apparatus such as a facsimile (FAX) machine has a receipt acknowledgment notifying function for a transmitter checking whether transmitted image data is normally received when the image data is transmitted from a transmitting side apparatus to a receiving side apparatus. With the receipt acknowledgment notifying function, the receiving side apparatus notifies the transmitting side apparatus of receipt acknowledgment information including that the image data transmitted from the transmitting side apparatus has normally reached the receiving side apparatus and the transmission has been interrupted during the reception (see Japanese Patent Application Laid-open No. 2000-151957 and Japanese Patent Application Laid-open No. 2000-174973).

Even in the conventional image communication apparatus, a transmitter can check whether image data has normally reached the receiving side apparatus. However, the receipt acknowledgment notifying function in the conventional image communication apparatus only notifies a transmitting side terminal of whether the receiving side apparatus has normally received the image data. Therefore, in the image communication apparatus, the transmitter cannot check the quality of the image data printed by the receiving side apparatus.

SUMMARY OF THE INVENTION

It is an object of the present invention to at least partially solve the problems in the conventional technology.

According to an aspect of the present invention there is provided an image communication apparatus that includes an image-data receiving unit that receives image data, a storing unit that stores therein the image data received by the image-data receiving unit, and an output unit that outputs the image data stored in the storing unit, the image communication apparatus including a scanning unit that scans the image data output by the output unit; a difference extracting unit that extracts a difference between the image data scanned by the scanning unit and the image data stored in the storing unit; a difference determining unit that determines whether the difference extracted by the difference extracting unit satisfies a predetermined condition based on condition information obtained together with the image data; and a control unit that controls so that a message is transmitted to a transmission source of the image data based on a result determined by the difference determining unit.

According to another aspect of the present invention there is provided an image communication system that transmits and receives image data via a network, the image communication system including an image-data input unit through which image data to be transmitted and received is input; a condition-information obtaining unit that obtains condition information on a difference condition for determining a difference between image data obtained by scanning an image output based on the image data and the image data in an apparatus that receives the image data, in accordance with an operation by a user; an image-data transmitting unit that transmits obtained image data and the condition information; an image-data receiving unit that receives transmitted image data; a storing unit that stores therein the image data received by the image-data receiving unit; an output unit that outputs the image data stored in the storing unit; a scanning unit that scans the image data output by the output unit; a difference extracting unit that extracts a difference between the image data scanned by the scanning unit and the image data stored in the storing unit; a difference determining unit that determines whether the difference extracted by the difference extracting unit satisfies a predetermined condition based on the condition information obtained together with the image data; and a control unit that controls so that a message is transmitted to a transmission source of the image data based on a result determined by the difference determining unit.

According to still another aspect of the present invention there is provided a control program for causing an information processing apparatus to operate as an image communication apparatus that receives image data via a network, the control program causing the information processing apparatus to execute receiving image data; storing received image data; outputting stored image data; scanning output image data that is output at the outputting; extracting a difference between scanned image data and the stored image data; determining whether extracted difference satisfies a predetermined condition based on condition information obtained together with the image data; and transmitting a message to a transmission source of the image data based on determined result that is determined at the determining.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
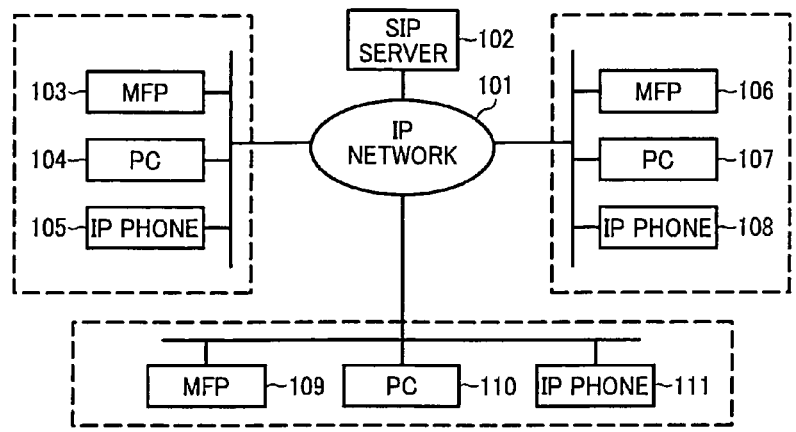
FIG. 1 is a diagram illustrating an operation mode of a multifunction product (MFP) according to a first embodiment.

Exemplary embodiments according to the present invention are explained in detail below with reference to the accompanying drawings. In the specification and the drawings, components having substantially the same functional configuration will be given the same reference numerals and overlapping explanation is omitted.

In the embodiments, explanation is given for an MFP in which functions of respective devices such as a printer, a copier, a FAX machine, and a scanner are integrated in one housing as an example of an image communication apparatus; however, any image communication apparatus having an image communication function can be employed. Moreover, in the embodiments, explanation is given for a case where an internet protocol (IP)-FAX function of connecting to a partner device by using a session initiation protocol (SIP) server is used as the image communication function of the image communication apparatus, although the image communication function is not limited thereto.

FIG. 1 is a diagram illustrating an operation form of an MFP according to a first embodiment. As shown in FIG. 1, an IP network 101 is connected to an SIP server 102. An MFP 103, a personal computer (PC) 104, and an IP phone 105 are present in a location A, an MFP 106, a PC 107, and an IP phone 108 are present in a location B, and an MFP 109, a PC 110, and an IP phone 111 are present in a location C, which are communicatable with each other via the IP network 101. The MFP 103 and the MFP 106 are the same model manufactured by the same maker, and the MFP 109 is a model manufactured by a maker different from the MFP 103 and the MFP 106.

Figure 2:
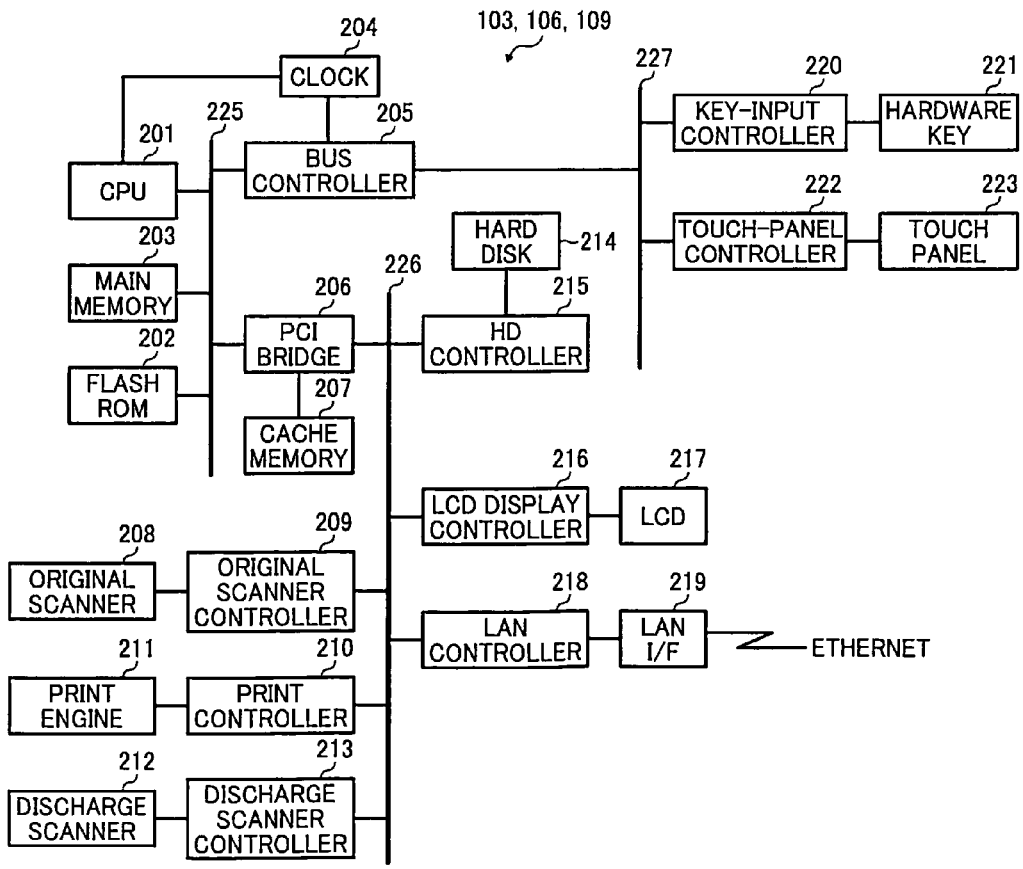
FIG. 2 is a block diagram illustrating a hardware configuration of the MFP according to the first embodiment.

FIG. 2 is a block diagram illustrating a hardware configuration of the MFP 103, the MFP 106, or the MFP 109 according to the present embodiment. As shown in FIG. 2, in the MFP 103, the MFP 106, or the MFP 109 according to the present embodiment, a central processing unit (CPU) 201, a flash read only memory (flash ROM) 202, a main memory 203, a clock 204, a bus controller 205, a peripheral component interconnect (PCI) bridge 206, and a cache memory 207 are connected with each other via a CPU bus 225.

Moreover, in the MFP 103, the MFP 106, or the MFP 109, an original scanner 208, an original scanner controller 209, a print controller 210, a print engine 211, a discharge scanner 212, a discharge scanner controller 213, a hard disk (HD) 214, an HD controller 215, a liquid crystal display (LCD) display controller 216, an LCD 217, a local area network (LAN) controller 218, a LAN interface (LAN I/F) 219 are connected with each other via a PCI bus 226.

Furthermore, in the MFP 103, the MFP 106, or the MFP 109, a key-input controller 220, a hardware key 221, a touch-panel controller 222, a touch panel 223 are connected with each other via an X bus (internal bus) 227.

Moreover, in the MFP 103, the MFP 106, or the MFP 109, the CPU bus 225, the PCI bus 226, and the X bus 227 are connected with each other via the bus controller 205 or the PCI bridge 206.

The CPU 201 executes and processes a control processing program or an operating system (OS) stored in the flash ROM 202. The main memory 203 includes a dynamic random access memory (DRAM) and is used as a work area for the CPU 201 or the like.

The flash ROM 202 is a ROM in which data is not erased even if the power is turned off and which is electrically rewritable. In the flash ROM 202, various programs for starting up a system and realizing functions of the MFP at the time of power-on are written in advance. Moreover, the flash ROM 202 stores therein data such as switches and parameters to be referred to when executing computer programs.

The clock 204 includes a crystal oscillator and a divider circuit, and generates a clock for controlling operation timing of the CPU 201 and the bus controller 205. The bus controller 205 controls data transfer between the CPU bus 225 and the X bus 227.

The PCI bridge 206 performs data transfer between the PCI bus 226 and the CPU 201 by using the cache memory 207. The cache memory 207 includes a DRAM and is used by the PCI bridge 206.

The original scanner 208 scans an image on a sheet by a color charge-coupled device (CCD) line sensor with a one-dimensionally arrayed light-emitting diode (LED) array as a light source, and converts each analog image signal of red (R), green (G), and blue (B) output from the color CCD line sensor into digital image data by an analog/digital (A/D) conversion. The original scanner controller 209 controls an original scanning operation by the original scanner 208, and performs compression (encoding) processing conforming to Joint Photographic Experts Group (JPEG) by converting RGB digital image data input from the original scanner 208 into a color difference component (Cb, Cr) and a luminance component (Y). In the present embodiment, the original scanner 208 is used; however, it is not limited thereto so long as the device can scan an image on a sheet. For example, an image on a sheet can be scanned by a camera instead of the original scanner 208.

The print controller 210 controls the operation of the print engine 211. The print engine 211 prints a color image or a monochrome image on a sheet by using toner of cyan, magenta, yellow, and black.

The discharge scanner 212 scans an image on a sheet and converts a scanned analog image signal into digital image data in the similar manner to the original scanner 208. The discharge scanner controller 213 controls an original scanning operation by the discharge scanner 212. Details of the discharge scanner are described later.

The HD 214 stores therein image data input from the original scanner 208, image data received through communication, and the like. The HD controller 215 functions as an interface with the HD 214 to perform high-speed data transfer with the HD 214.

The LCD display controller 216 performs a digital/analog (D/A) conversion on character data, graphic data, and the like, and performs control for displaying these data on the LCD 217.

The LAN controller 218 executes a communication protocol, for example, conforming to Institute of Electrical and Electronics Engineers (IEEE) 802.3 standard and controls communication with other devices connected to the Ethernet (registered trademark) via the LAN I/F 219.

The key-input controller 220 performs conversion of serial data input from the hardware key 221 into parallel data. The touch-panel controller 222 detects a part on the touch panel 223 with which an object such as a finger comes into contact and obtains position information thereof. The touch panel 223 is superimposed on the LCD 217 to be in close-contact therewith.

Figure 3:
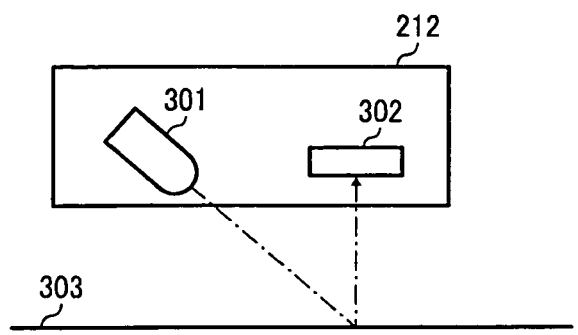
FIG. 3 is a configuration diagram of a discharge scanner according to the first embodiment.
Figure 4:
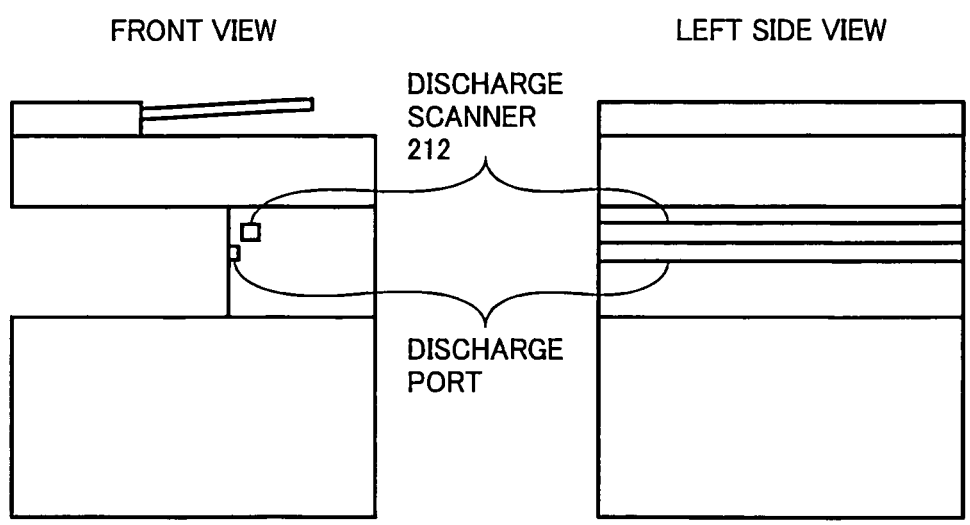
FIG. 4 is a diagram illustrating an attachment position of the discharge scanner according to the first embodiment.

FIG. 3 illustrates a configuration of the discharge scanner 212. The discharge scanner 212 includes an LED array 301 and a color CCD line sensor 302. The light emitted from the LED array 301 is reflected by a sheet 303 as a scanning target and is input to the color CCD line sensor 302. As shown in FIG. 4, the discharge scanner 212 is attached to the inside of a discharge port.

Figure 5:
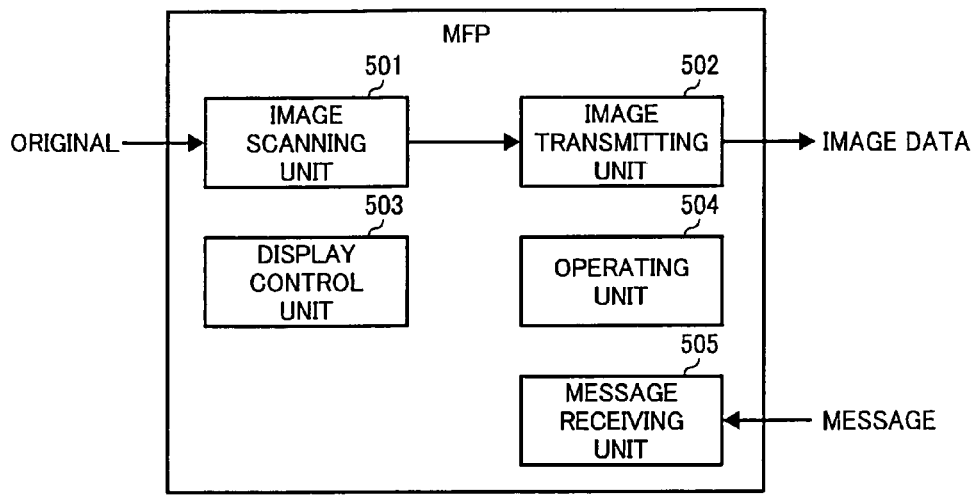
FIG. 5 is a functional configuration diagram when the MFP functions as a transmitter according to the first embodiment.

FIG. 5 illustrates a functional configuration diagram when the MFP 103, the MFP 106, or the MFP 109 functions as a transmitter.

An image scanning unit 501 scans an image on an original by using the original scanner 208 and obtains RGB digital image data. Moreover, the image scanning unit 501 converts the RGB digital image data into data on the color difference component (Cb, Cr) and the luminance component (Y) by the original scanner controller 209 to perform JPEG compression (encoding).

An image transmitting unit 502 performs a call connection using the SIP defined in Request for Comments (RFC) 3261 and the IP-FAX protocol defined in ITU-T recommendation T.38 to transmit JPEG-encoded image data by the image scanning unit 501 to another terminal. For example, the image transmitting unit 502 functions as an image-data transmitting unit.

A display control unit 503 controls display processing for various screens and the like on the LCD 217. Specifically, the display control unit 503 controls display of a menu screen for specifying various functions, display of a screen for inputting a transmission destination for IP-FAX transmission, and the like.

An operating unit 504 controls various operation processing based on key data input from the hardware key 221 and coordinate data input from the touch panel 223.

A message receiving unit 505 receives an SIP instant message transmitted from another terminal.

Figure 6:
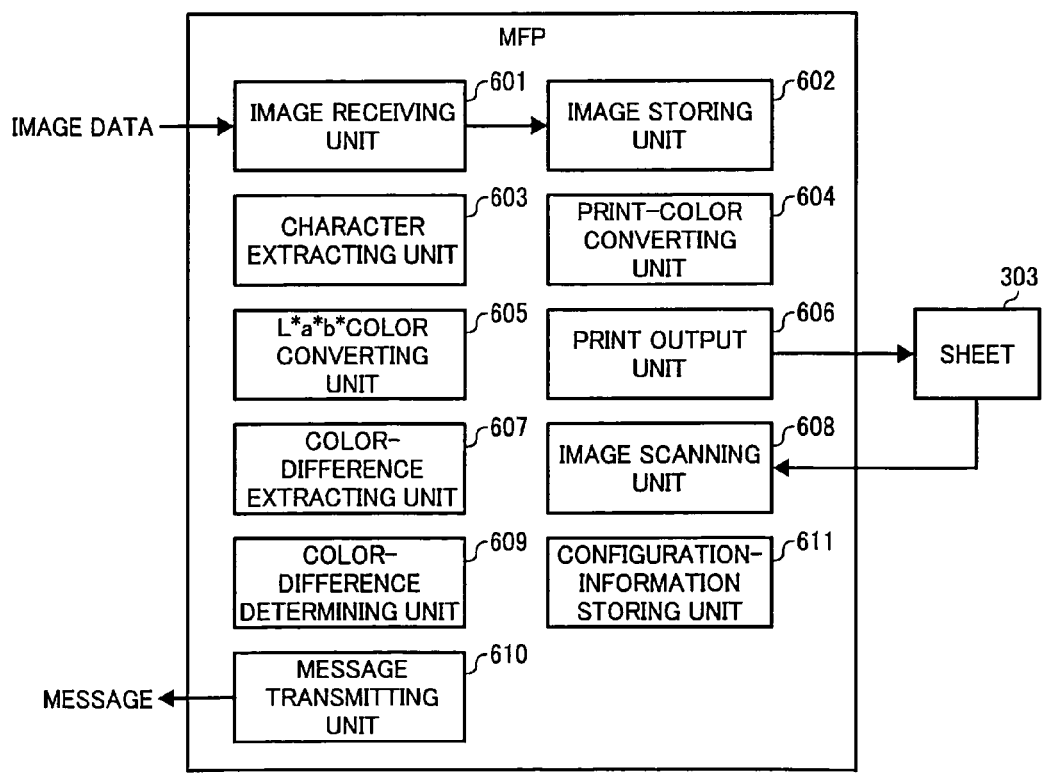
FIG. 6 is a functional configuration diagram when the MFP functions as a receiver according to the first embodiment.

FIG. 6 illustrates a functional configuration diagram when the MFP 103, the MFP 106, or the MFP 109 functions as a receiver.

An image receiving unit 601 performs an incoming call connection using the SIP and the IP-FAX protocol defined in ITU-T Recommendation T.38 to receive JPEG image data from another IP-FAX machine. For example, the image receiving unit 601 functions as an image-data receiving unit.

An image storing unit 602 stores the JPEG image data received by the image receiving unit 601 in the HD 214. For example, the image storing unit 602 functions as a storing unit.

A character extracting unit 603 extracts a character from image data in accordance with an algorithm to be described later. For example, the character extracting unit 603 functions as a character extracting unit.

A print-color converting unit 604 performs expansion (decoding) processing conforming to JPEG on the JPEG image data stored in the HD 214 to convert image data separated into the color difference component (Cb, Cr) and the luminance component (Y) into RGB image data and convert the RGB image data into print image data of yellow (Y), magenta (M), cyan (C), and black (K). Moreover, the print-color converting unit 604 stores the RGB image data converted from the JPEG image data in the main memory 203 so that the character extracting unit 603 and an L*a*b* color converting unit 605 can use the RGB image data.

The L*a*b* color converting unit 605 first converts the RGB image data from RGB into CIE XYZ by Equation (1). Equation (1) is defined in International Radio Consultative Committee (CCIR) 709.

$$X=(0.4124*R+0.3576*G+0.1805*B) \times 100$$

$$Y=(0.2126*R+0.7152*G+0.0722*B) \times 100$$

$$Z=(0.0193*R+0.1192*G+0.9505*B) \times 100 \quad (1)$$

Next, the L*a*b* color converting unit 605 converts CIE XYZ into L*a*b* by Equations (2) to (7), where Xn=95.045, Yn=100.000, and Zn=108.892. Here, Xn, Yn, and Zn are values under a D65 light source.

$$\text{When } X/Xn>0.008856, Xr=(X/Xn)1/3 \quad (2)$$

$$\text{When } X/Xn \leq 0.008856, Xr=7.787 \times (X/Xn)+16/116$$

$$\text{When } Y/Yn>0.008856, Yr=(Y/Yn)1/3 \quad (3)$$

$$\text{When } Y/Yn \leq 0.008856, Yr=7.787 \times (Y/Yn)+16/116$$

$$\text{When } Z/Zn>0.008856, Zr=(Z/Zn)1/3 \quad (4)$$

$$\text{When } Z/Zn \leq 0.008856, Zr=7.787 \times (Z/Zn)+16/116$$

$$\text{When } Y/Yn>0.008856, L^*=116 \times (Y/Yn)1/3-16 \quad (5)$$

$$\text{When } Y/Yn \leq 0.008856, L^*=903.29 \times (Y/Yn)$$

$$a^*=500 \times (Xr-Yr) \quad (6)$$

$$b^*=200 \times (Yr-Zr) \quad (7)$$

A print output unit 606 prints YMCK image data on the sheet 303 by using the print engine 211. For example, the print output unit 606 functions as an output unit.

A color-difference extracting unit 607 obtains a difference (color difference) between two colors in accordance with an algorithm to be described later. For example, the color-difference extracting unit 607 functions as a difference extracting unit.

A color-difference determining unit 609 compares the color difference obtained by the color-difference extracting unit 607 with a predetermined condition to make a determination. The predetermined condition indicates a value of a color difference ΔE94 (CIE1994) allowable as a difference condition. In the present embodiment, the value of ΔE94 to be the difference condition is transmitted together with image data by the IP-FAX. For example, the color-difference determining unit 609 functions as a difference determining unit.

An image scanning unit 608 scans an image printed on the sheet 303 by using the discharge scanner 212, obtains RGB digital image data, and stores the RGB digital image data in the main memory 203 so that the L*a*b* color converting unit 605 can use the RGB digital image data. Moreover, the image scanning unit 608 converts the RGB digital image data into data on the color difference component (Cb, Cr) and the luminance component (Y) and stores only image data on the luminance component (Y) in the main memory 203 so that the character extracting unit 603 can use the image data on the luminance component (Y). For example, the image scanning unit 608 functions as a scanning unit.

A message transmitting unit 610 transmits a message to another terminal by using the SIP instant message.

A configuration-information storing unit 611 stores information to be a color difference condition for determining whether the color obtained by printing received color image data is different from a color of an image on an original and the like in the flash ROM 202. The information to be the difference condition is transmitted together with image data by the IP-FAX and is obtained by the image receiving unit 601 together with the image data. The obtaining of the difference condition is described in detail later.

Figure 7:
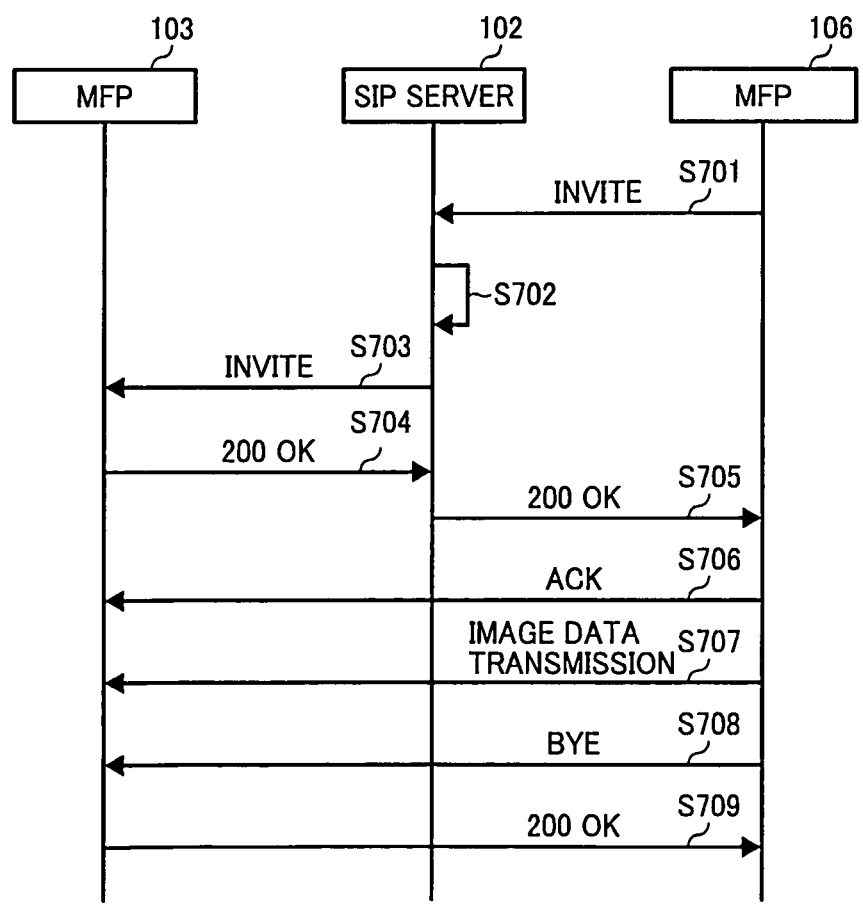
FIG. 7 is a diagram illustrating a flow of a communication operation with a protocol defined in International Telecommunication Union Telecommunication Standardization Sector (ITU-T) Recommendation T.38 according to the first embodiment.

Next, the flow of the operation in which the MFP 106 present in the location B shown in FIG. 1 communicates with the MFP 103 present in the location A shown in FIG. 1 with a protocol defined in ITU-T Recommendation T.38 is explained, with reference to a sequence diagram shown FIG. 7.

First, the MFP 106 transmits an INVITE message including a FAX number of the MFP 103 to the SIP server 102 (Step S701).

Then, the SIP server 102 refers to a correspondence table of a FAX number and an IP address that are already registered (Step S702) and transmits the INVITE message to the MFP 103 (Step S703).

The MFP 103 that receives the INVITE message transmits a 200OK response indicating a success to the SIP server 102 (Step S704). The SIP server 102 that receives the 200OK response transmits the 200OK response to the MFP 106 (Step S705).

The MFP 106 that receives the 200OK response transmits an ACK message to the MFP 103 to establish a session (Step S706).

Then, the MFP 106 transmits image data to the MFP 103 by executing a protocol defined in ITU-T Recommendation T.38 (Step S707). When the image data transmission is completed, the MFP 106 transmits a BYE message to the MFP 103 (Step S708). Then, the MFP 103 transmits the 200OK response to the MFP 106, and the session ends (Step S709).

Next, the operation when the MFP 106 shown in FIG. 1 transmits color image data to the MFP 103 shown in FIG. 1 is explained with reference to a flowchart shown FIG. 8.

When a transmitter sets a color original on the original scanner 208 and inputs a character string that should be subjected to a color difference determination, the operating unit 504 obtains an input specified character string (Step S801). Then, the transmitter inputs a FAX number of the MFP 103 and presses a start key. Then, the image scanning unit 501 controls the original scanner controller 209 to scan an original image by the original scanner 208, thereby obtaining RGB digital image data (Step S802).

Next, the image scanning unit 501 converts the scanned RGB digital image data into data on the color difference component (Cb, Cr) and the luminance component (Y) to perform the JPEG encoding (Step S803). Then, the image scanning unit 501 converts the generated data on the luminance component (Y) into binary data to generate the binary data. The display control unit 503 reduces the generated binary data image and displays it on the LCD 217 (Step S804).

When the transmitter checks the binary data displayed on the LCD 217, the transmitter specifies the position at which the character string input at Step S801 is displayed. Whereby, the operating unit 504 obtains the coordinate information (hereinafter, specified-character-string coordinate information) on the position at which the specified character string is displayed (Step S805). The transmitter specifies the position at which the character string is displayed by touching the touch panel 223 as the operating unit 504 or the like. The area of the binary data to be displayed on the LCD 217 can move by scrolling.

Figure 9:
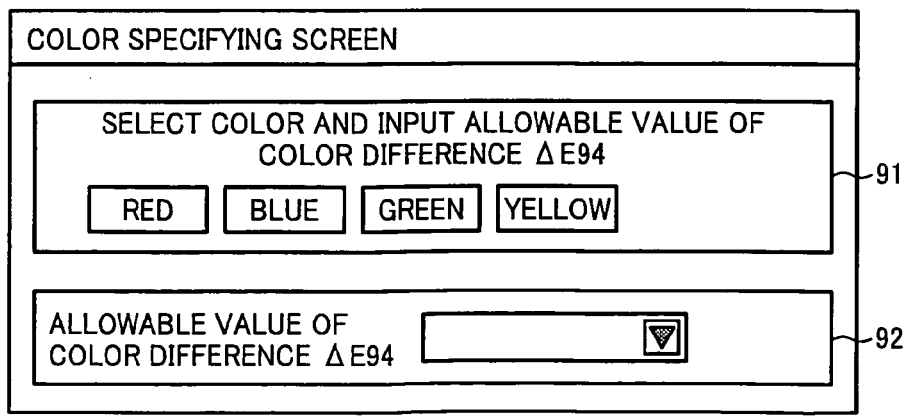
FIG. 9 is a diagram illustrating an example of a graphical user interface (GUI) of a color specifying screen in the MFP on the transmitting side according to the first embodiment.

When the operating unit 504 obtains the specified-character-string coordinate information, the display control unit 503 displays a color specifying screen (Step S806). FIG. 9 illustrates an example of a GUI of the color specifying screen displayed at Step S806. As shown in FIG. 9, the GUI of the color specifying screen according to the present embodiment includes a color selecting section 91 and an allowable-value specifying section 92.

The color selecting section 91 is a section for a transmitter specifying a color group for which a difference between a color of an image on an original output on the receiving side in the IP-FAX and a color on the transmission source should be determined. As shown in FIG. 9, in the present embodiment, all of hues are classified into hue ranges with red, blue, green, and yellow as representing colors, i.e., four groups. A user specifies a color (hereinafter, specified color) for which a difference should be determined on the receiving side by touching each color displayed on the color selecting section 91. A color to be selected from the colors shown in FIG. 9 is not limited to one and a plurality of colors can be selected.

The allowable-value specifying section 92 is a section for a transmitter specifying a value of $\Delta E94$ indicating a range to be allowed when determining a difference in color on the receiving side in the IP-FAX, i.e., a range in which a color of an image on an original is determined to be reproduced. Specifically, the value specified in the allowable-value specifying section 92 is used as a predetermined condition referred to by the color-difference determining unit 609.

Figure 10:
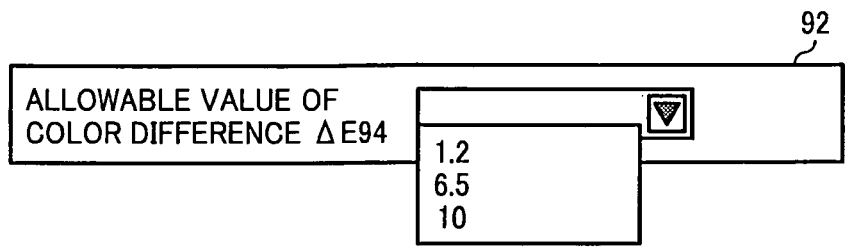
FIG. 10 is a diagram illustrating an example of the GUI of part of the color specifying screen in the MFP on the transmitting side according to the first embodiment.

A transmitter can specify a numerical value by selecting a predetermined numerical value in addition to directly inputting an arbitrary numerical value in the allowable-value specifying section 92. An example of such form is shown in FIG. 10. As shown in FIG. 10, in the allowable-value specifying section 92 according to the present embodiment, numerical values "1.2", "6.5", and "10" are preset. A transmitter can easily specify an allowable value by selecting a preset numerical value. The value of $\Delta E94$ indicates that the larger value has a larger color difference.

The preset values "1.2", "6.5", and "10" are reference values used for comparing colors in the paint industry. For example, the value "1.2" is a value indicating a difference of the degree that most people can recognize the difference with the naked eye when comparing different colors side by side.

The value "6.5" is a value indicating a difference of the degree that different colors can be recognized as the same color sensuously when the different colors are observed at different locations. The value "10" is a value in which the allowable range in which different colors are determined to be the same color is further expanded.

When a transmitter inputs the specified color and the allowable value on the screen shown in FIG. 9, the operating unit 504 obtains information on the specified color and the allowable value (Step S807). When the operating unit 504 obtains the information on the specified color and the allowable value, the image transmitting unit 502 transmits JPEG-encoded image data to the MFP 103 together with the hue group number, the allowable value of the color difference $\Delta E94$, the specified character string, and the coordinate information by the communication procedure shown in FIG. 7 (Step S808), and the processing ends.

Figure 11:
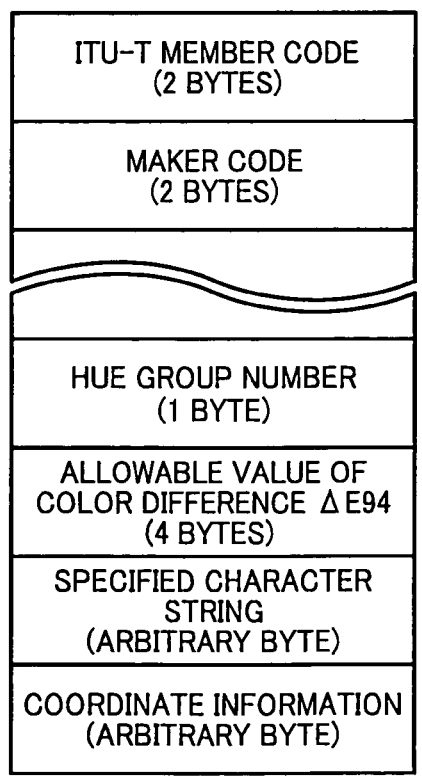
FIG. 11 is a diagram illustrating an example of information included in a Non-Standard Facilities Set-up (NSS) command that the MFP on the transmitting side transmits according to the first embodiment.

At Step S808, the image transmitting unit 502 transmits the hue group number, the allowable value of the color difference $\Delta E94$, the specified character string, and the coordinate information while including them in the NSS command of a protocol defined in ITU-T Recommendation T.38. An example of the NSS command is shown in FIG. 11. As shown in FIG. 11, the NSS command includes an ITU-T member code, a maker code, the hue group number, the allowable value of the color difference $\Delta E94$, the specified character string, and the coordinate information.

Figure 12:
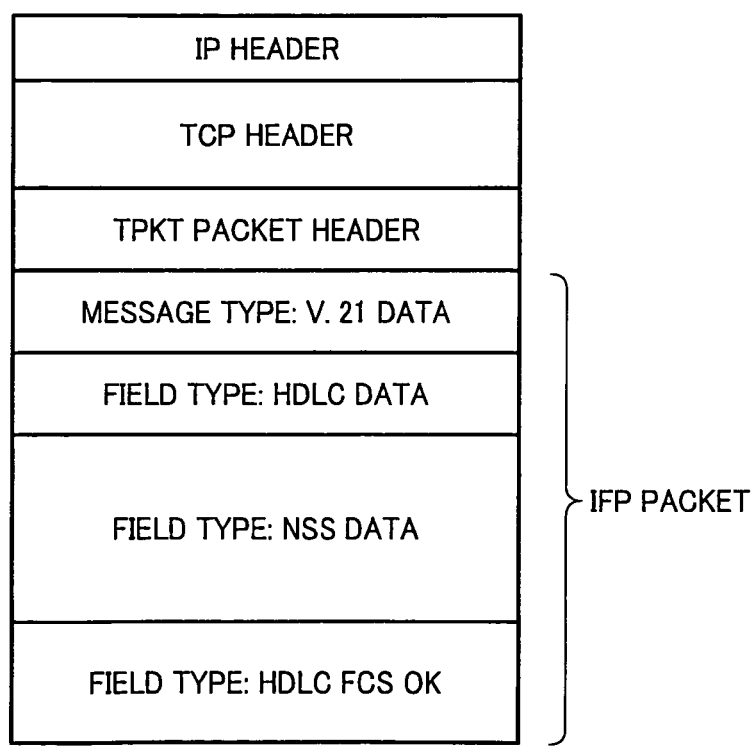
FIG. 12 is a diagram illustrating a data structure of a Transmission Control Protocol (TCP) packet according to the first embodiment.

The NSS command is a command defined in ITU-T Recommendation T.30 that is referred to by ITU-T Recommendation T.38. Therefore, ITU-T Recommendation T.38 is specified such that a High-level Data Link Control procedure (HDLC) frame such as the NSS defined in ITU-T Recommendation T.30 is contained in an Internet Facsimile Protocol (IFP) packet and the IFP packet is further contained in a User Datagram Protocol (UDP) packet or a TCP packet to be transmitted. FIG. 12 illustrates a data structure in the case of the TCP packet.

The hue group number is information on an ID indicating the specified color obtained at Step S807. Specifically, the hue group number is used as information for specifying the hue range. The allowable value of the color difference $\Delta E94$ is a value of the allowable value information obtained at Step S807. The specified character string is information on the character string obtained at Step S801. The coordinate information is information obtained at Step S805.

As shown in FIG. 11, the information to be transmitted by the image transmitting unit 502 includes the hue group number, the allowable value of the color difference $\Delta E94$, the specified character string, and the coordinate information, so that a color of an image on an original output on the receiving side of image data can be determined. In other words, the hue group number, the allowable value of the color difference $\Delta E94$, the specified character string, and the coordinate information are used as condition information indicating a predetermined condition for determining a difference of an image in the MFP on the receiving side of the image.

Next, the operation of the MFP 103 when receiving color image data transmitted from the MFP 106 is explained with reference to a flowchart shown in FIG. 13.

In the MFP 103, when the image receiving unit 601 receives JPEG image data transmitted from the MFP 106, the image storing unit 602 stores the received JPEG image data in the HD 214 (Step S1301). The MFP 103 also receives the NSS command shown in FIG. 11 at Step S1301.

Next, the print-color converting unit 604 performs the expansion (decoding) processing conforming to JPEG on the JPEG image data stored in the HD 214 to convert the image data separated into the color difference component (Cb, Cr) and the luminance component (Y) into RGB image data and further convert RGB into YMCK print image data. At this time, the print-color converting unit 604 stores the image data on the luminance component (Y) obtained by the JPEG expansion and the RGB image data converted from the color difference component (Cb, Cr) and the luminance component (Y) in the main memory 203 so that the character extracting unit 603 can use the image data on the luminance component (Y) and the L*a*b* color converting unit 605 can use the RGB image data (Step S1302).

Then, the print output unit 606 prints the image data converted into YMCK on the sheet 303 by using the print engine 211 (Step S1303).

Next, when the sheet on which the image is printed passes the discharge port, the image scanning unit 608 scans the image printed on the sheet 303 by using the discharge scanner 212, obtains RGB digital image data, and stores the RGB digital image data in the main memory 203 so that the L*a*b* color converting unit 605 can use the RGB digital image data (Step S1304).

Moreover, the image scanning unit 608 converts the RGB image data into data on the color difference component (Cb, Cr) and the luminance component (Y) and stores only the image data on the luminance component (Y) in the main memory 203 so that the character extracting unit 603 can use the image data on the luminance component (Y) (Step S1305).

Next, the character extracting unit 603 compares the stored luminance component (Y), i.e., the image data on the luminance component (Y) generated by the image scanning unit 608 scanning the image printed on the sheet 303 by using the discharge scanner 212, with a predetermined luminance value stored in the flash ROM 202 in advance as a threshold level, and converts the image data on the luminance component (Y) into a binary image in which image data equal to or more than the threshold level is processed as a white pixel (bit value is 0) and image data less than the threshold level is processed as a black pixel (bit value is 1). Then, a character image is extracted from the binary image, and character recognition is performed on this character image (Step S1306). At Step S1306, the character extracting unit 603 refers to the coordinate information shown in FIG. 11 and extracts the character image from the position indicated by the coordinate information to perform the character recognition. The extraction of the character image and the character recognition are performed by using a method described, for example, in Toshiba Review 1997 VOL. 52 NO. 2.

Figure 14:
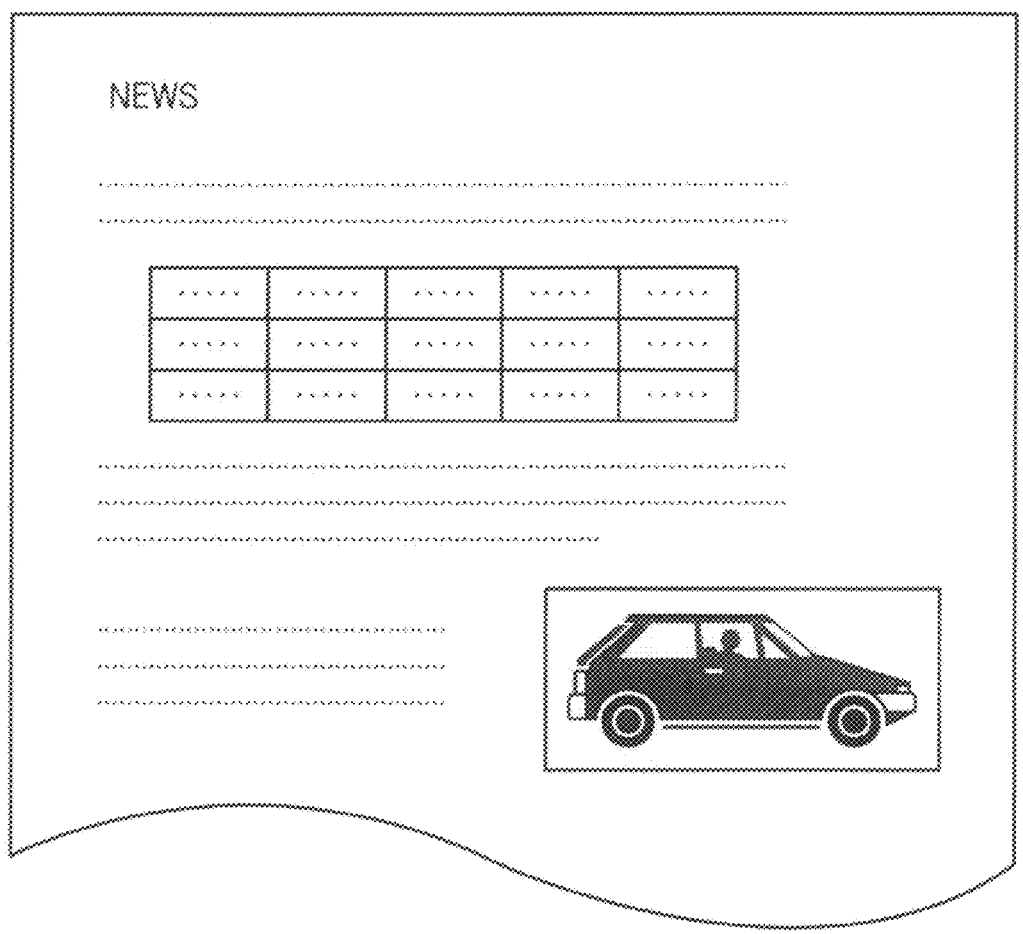
FIG. 14 is a diagram illustrating an example of a binary image according to a second embodiment.

An example of the binary image is shown in FIG. 14. In FIG. 14, characters other than "NEWS" are expressed as "...". In the present embodiment, an example is explained for the case where the part "NEWS" shown in FIG. 14 is specified by the coordinate information. In the binary image shown in FIG. 14, first, each of the characters "N", "E", "W", and "S" is recognized by the character recognition.

Next, the character extracting unit 603 compares the character string of the specified character string shown in FIG. 11 with the character string recognized from the image data on the luminance component (Y) stored by the image scanning unit 608 (Step S1307).

Then, when both of the character strings do not match with each other (No at Step S1307), the message transmitting unit 610 transmits a message indicating that the color of the print image cannot be compared with a color of an image on an original to the MFP 106 as a transmission source terminal (Step S1313), and the processing ends. At this time, the message transmitting unit 610 transmits the message to the MFP 106 by using the SIP instant message.

When both of the character strings match with each other (Yes at Step S1307), the system control proceeds to the processing for color-converting RGB image data corresponding to the binary character image that is character-recognized into L*a*b*. For making a condition determination to be described later easy, a method of color-converting RGB image data into L*a*b* is employed in the present embodiment.

The character extracting unit 603 first sends image data on a character image area (rectangle) of "N" binarized from the image data on the luminance component (Y) stored by the print-color converting unit 604 and image data corresponding to this rectangular area from the RGB image data stored by the print-color converting unit 604 to the L*a*b* color converting unit 605. The L*a*b* color converting unit 605 converts RGB data on each pixel corresponding to a black pixel (bit value is 1) in binary pixels in this area into L*a*b* by Equations (1) to (7) described above. When the color of a pixel in the character "N" is red, a* of the pixel is a large positive value, b* is a small positive or negative value, and L* is a value around 40 to 60. Then, the L*a*b* color converting unit 605 calculates the average of each of L*, a*, and b* for the pixels converted into L*a*b* (Step S1308). At this time, a pixel having a value that significantly deviates from the average can be eliminated.

Then, it is determined whether a combination of the respective averages of L*, a*, and b* is included in the hue group specified by the hue group number shown in FIG. 11 (Step S1309). For this determination, the character extracting unit 603 includes table information indicating a correspondence relationship between the hue group number and the hue range (range of each value of L*, a*, and b*) corresponding to the hue group.

When the color of the pixel in the target character is not included in the specified hue group (No at Step S1309), that is, when the color of the pixel is out of the specified hue range, the character extracting unit 603 recognizes that the determination of the color difference is not needed and the processing ends.

In the similar manner, the character extracting unit 603 sends the image data on the character image area (rectangle) of "N" binarized from the image data on the luminance component (Y) stored by the image scanning unit 608 and the image data corresponding to this rectangular area from the RGB image data stored by the image scanning unit 608 to the L*a*b* color converting unit 605. In the similar manner, the L*a*b* color converting unit 605 converts RGB data on each pixel corresponding to a black pixel (bit value is 1) in the binary pixels into L*a*b* and calculates the average of each of L*, a*, and b* for the pixels (Step S1308).

Next, the system control proceeds to processing for obtaining the color difference that is information indicating a difference in color from the two L*a*b* values. In the present embodiment, $\Delta E94$ (CIE1994) is used as the color difference. The color-difference extracting unit 607 performs a calculation for obtaining $\Delta E94$ by Equations (8) and (9) with the two L*a*b* values as (L1,a1,b1) and (L2,a2,b2) (Step S1310).

$$\Delta E = \sqrt{(L1-L2)2+(a1-a2)2+(b1-b2)2} \quad (8)$$

$$\Delta E94 = \sqrt{(L1-L2)2+\Delta C2+\Delta H2} \quad (9)$$

$\Delta C = (\sqrt{(a12+b12)} - \sqrt{(a22+b22)})/(1+0.045 \cdot C^*)$
$\Delta H = \sqrt{\Delta E2 - \Delta C2 - (L1-L2)2}/(1+0.015 \cdot C^*)$
$C^* = \sqrt{(a12+b12)}$ Next, the color-difference determining unit 609 compares the value of the obtained color difference $\Delta E94$ with the allowable value of the color difference $\Delta E94$ shown in FIG. 11, i.e., the allowable value (hereinafter, difference condition) included in the NSS command received at Step S1301 (Step S1311).

Then, when the obtained color difference $\Delta E94$ is larger than the value of the difference condition (No at Step S1311), the message transmitting unit 610 transmits a message indicating that the color of the print image printed on the sheet 303 is different from the color of the image on the original to the MFP 106 as a transmission source terminal (Step S1314). At this time, the message transmitting unit 610 transmits the message to the MFP 106 by using the SIP instant message.

When the obtained color difference $\Delta E94$ is smaller than the value of the difference condition (Yes at Step S1311), the JPEG image data received and stored in the HD 214 is deleted (Step S1312). The stored JPEG image data is deleted when the obtained color difference $\Delta E94$ is smaller than the value of the difference condition and is not deleted when the obtained color difference $\Delta E94$ is larger than the value of the difference condition, so that the JPEG image data can be kept if a printed image is not one that a transmitter intends. The JPEG image data is kept, so that when color toner is insufficient, the stored JPEG image data can be reprinted after supplying the color toner and the processing for comparing the color of the print image with the color of the image on the original can be repeated.

As explained above, with the MFP according to the present embodiment, when a difference between received image data and a printed image of the image data is equal to or more than a predetermined value, information indicating the difference above is transmitted to a transmission source terminal, so that a transmitter of the image data can check the print quality.

In the above explanation, explanation is given for the example of scanning an image printed on the sheet 303 by the discharge scanner 212; however, the discharged sheet 303 can be scanned also by the original scanner 208. Whereby, the present invention can be performed without providing the discharge scanner at the discharge port.

In the above explanation, the color difference ΔE94 is calculated by comparing colors of pixels constituting a character. However, when pixels around the character are white pixels, the average of colors of pixels included in an area including the white pixels can be calculated and the color difference can be calculated by comparing the colors in this whole area. The flow of processing in this case is explained below.

When the L*a*b* color converting unit 605 calculates the average of each of L*, a*, and b*, the L*a*b* color converting unit 605 converts also RGB data on each pixel corresponding to a white pixel (bit value is 0) in binary pixels of a character image area (rectangle) into L*a*b*. When the color of a pixel in the character "N" is red, a* of the pixel is a large positive value, b* is a small positive or negative value, and L* is a value around 40 to 60. Moreover, when the color of other pixels in the rectangular area is white, a* and b* of the pixels are small positive or negative values and L* is a value close to 100 (the range of L* is 0 (black) to 100 (white)). When a pixel that does not constitute the character in the rectangular area is such that a* and b* are small positive or negative values and L* is a value close to 100, the L*a*b* color converting unit 605 determines that the color of this pixel is white. Then, when it is determined that all of the pixels that do not constitute the character in the rectangular area are white, the L*a*b* color converting unit 605 calculates the average of each of a* and b* for all of the pixels in the rectangular area. The L*a*b* color converting unit 605 calculates the average of L* while eliminating the value close to 100 that is determined as white. Then, the color difference extracting unit 607 obtains the color difference ΔE94 by using the averages of L*, a*, and b*.

Figure 13:
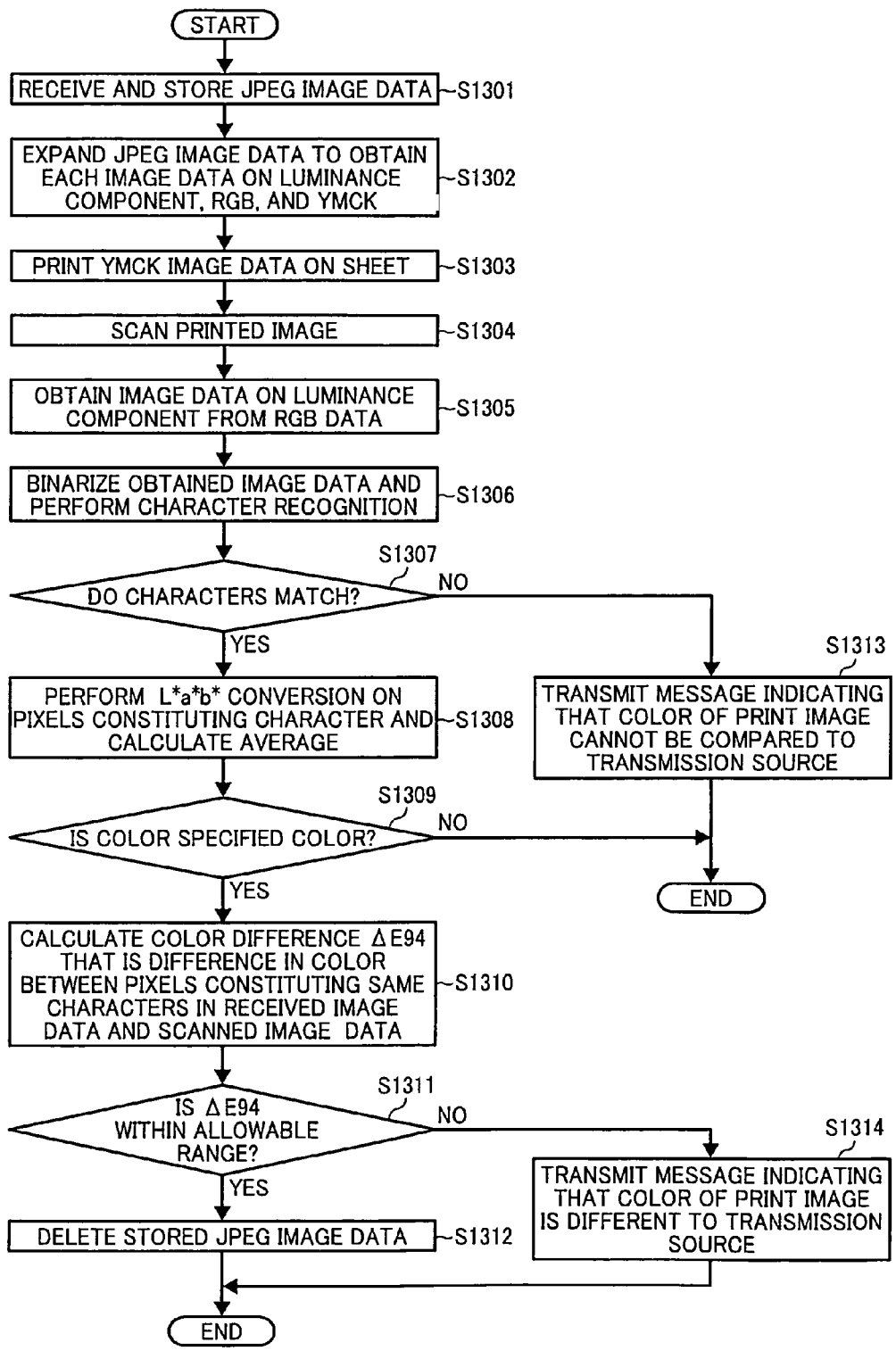
FIG. 13 is a diagram illustrating an operation when the MFP on the receiving side receives image data according to the first embodiment.

Moreover, in the above explanation, at Step S1313 or Step S1314 shown in FIG. 13, the message transmitting unit 610 transmits a message to the MFP 106 by using the SIP instant message as an example. Alternatively, the similar message can be transmitted to an e-mail address of a transmitter. This can be realized by including the e-mail address of the transmitter in the NSS command that the image transmitting unit 502 transmits at Step S808 shown in FIG. 8.

Furthermore, in the above explanation, as shown in FIGS. 9 and 10, a transmitter directly specifies the value of ΔE94 as an example. Alternatively, the MFP on the receiving side can determine the value of ΔE94 based on information transmitted together with an image.

For example, when an image is transmitted or received between the MFPs of the same model manufactured by the same maker, the design difference in color between a scanned image and a printed image is considered to be small. Therefore, when the MFP that receives an image refers to information on the maker code shown in FIG. 11, if the maker code is one that indicates the same maker as the own MFP, the value with a small allowable range, e.g., "1.2" described above, is used as the value of ΔE94. This, for example, corresponds to the case of transmitting an image from the MFP 103 to the MFP 106 with the above configuration.

On the other hand, when an image is transmitted or received between the MFPs from different makers, the design difference in color between a scanned image and a printed image is considered to be large. Therefore, when the MFP that receives an image refers to information on the maker code shown in FIG. 11, if the maker code is one that indicates a maker different from the own MFP, the value with a large allowable range, e.g., "6.5" or "10" described above, is used as the value of ΔE94. This, for example, corresponds to the case of transmitting an image from the MFP 103 to the MFP 109 with the above configuration.

With the example as described above, for example, even a transmitter who is unfamiliar with an expertise such as ΔE94 can appropriately determine a color on the receiving side.

Figure 8:
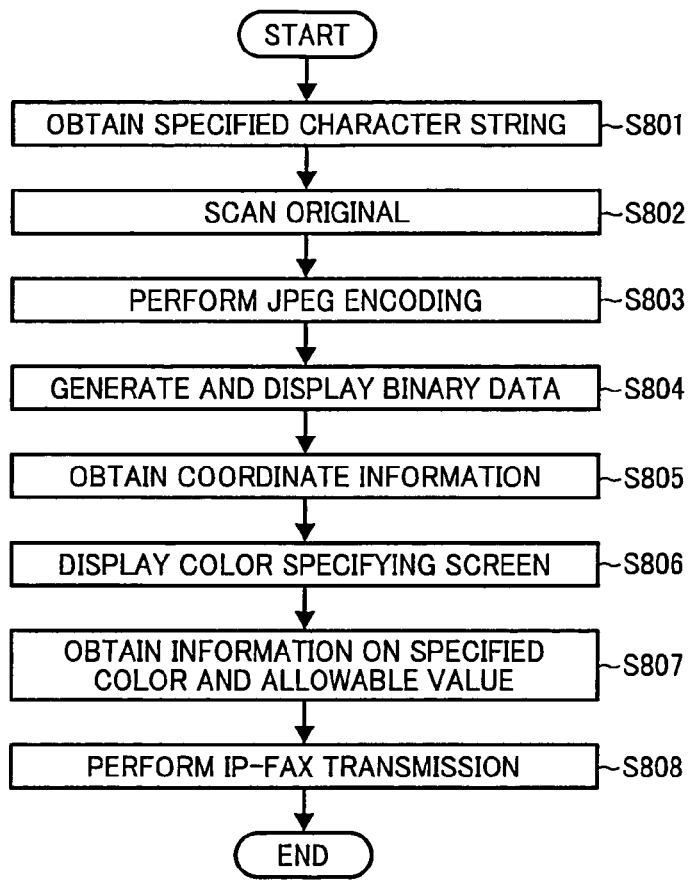
FIG. 8 is a diagram illustrating an operation when the MFP on the transmitting side transmits color image data to the MFP on the receiving side according to the first embodiment.

Moreover, in the above explanation, the operating unit 504 obtains information on a specified character string at Step S801 shown in FIG. 8, and the information on the specified character string is included in information transmitted by the image transmitting unit 502 at Step S808 as shown in FIG. 11 as an example. Whereby, in the MFP on the receiving side, the character extracting unit 603 compares the received specified character string with the character string that is recognized from the image data on the luminance component (Y) stored by the image scanning unit 608.

Furthermore, information on the specified character string can be eliminated from the information shown in FIG. 11 by eliminating the processing at Step S801. In this case, the character extracting unit 603 binarizes the image data on the luminance component (Y) stored by the print-color converting unit 604 and performs the character string recognition in the similar manner to Step S1306 in accordance with the coordinate information shown in FIG. 11. Then, at Step S1307, the character extracting unit 603 compares the character string recognized from the image data on the luminance component (Y) stored by the print-color converting unit 604 with the character string recognized from the image data on the luminance component (Y) stored by the image scanning unit 608. With this processing also, the effect similar to the above can be obtained.

In a second embodiment, in the comparison of character strings at Step S1307 shown in FIG. 13, explanation is given for the case where even when the character strings do not match with each other, this mismatch is allowed and the color difference is determined. Components that are given the same reference numerals as in the first embodiment indicate the same or similar units as those in the first embodiment and explanation thereof is omitted.

The operation form and the configuration of the MFP according to the present embodiment are almost the same as those explained in the first embodiment. In the present embodiment, processing in the MFP that transmits an image and processing in the MFP that receives an image are different from the first embodiment.

First, the processing in the MFP that transmits an image in the present embodiment is explained. The processing in the case where the MFP transmits an image in the present embodiment is almost the same as the processing explained with reference to FIG. 8; however, information obtained at Step S801 is different. At Step S801 according to the present embodiment, the operating unit 504 obtains information of the condition for proceeding to the determination of the color difference, i.e., Step S1308, at Step S1307 shown in FIG. 13, in addition to the above described specified character string. An example of a screen when a transmitter inputs the information that the MFP obtains at Step S801 is shown in FIG. 15.

Figure 15:
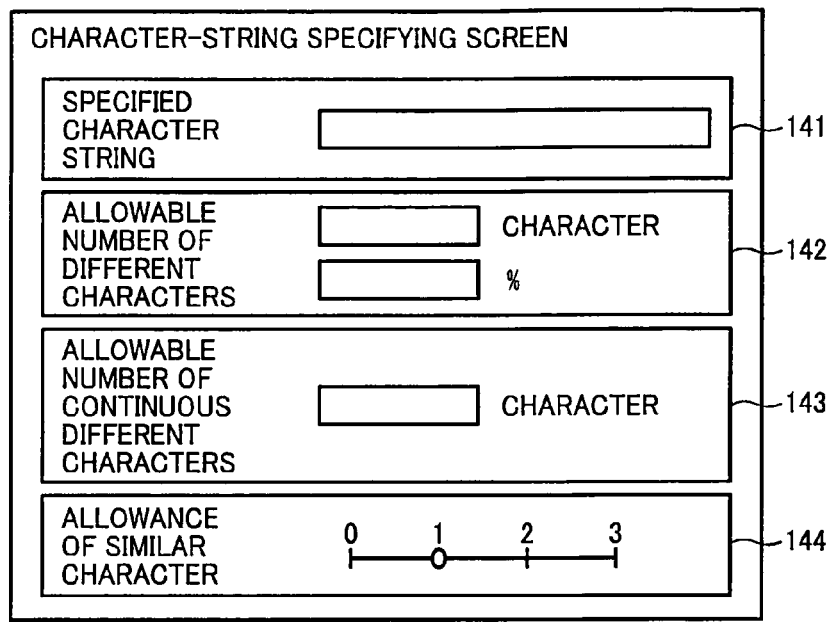
FIG. 15 is a diagram illustrating an example of the GUI of a character-string specifying screen in the MFP on the transmitting side according to the second embodiment.

FIG. 15 is a diagram illustrating an example of the GUI of a character-string specifying screen displayed on the LCD 217 by the display control unit 503 at Step S801. As shown in FIG. 15, the GUI of the character-string specifying screen according to the present embodiment includes a specified-character-string input section 141, an allowable number-of-different-characters input section 142, an allowable number-of-continuous-different-characters input section 143, and a similar-character-allowable-level specifying section 144.

In the similar manner to the first embodiment, the specified-character-string input section 141 is a section for a transmitter inputting a character string to be specified. Similarly to the case of an example in the first embodiment, a character string "NEWS" is input to the specified-character-string input section 141.

The allowable number-of-different-characters input section 142 is a section for a transmitter specifying the number of different characters or a percentage of the number of different characters to be allowed in the determination at Step S1307 shown in FIG. 13. The number of different characters is the number of characters that are determined to be different characters as a result of the character comparison at Step S1307. The application of the information input to the allowable number-of-different-characters input section 142 is explained later.

The allowable number-of-continuous-different-characters input section 143 is a section for specifying the allowable number of the number of different characters allowed in the determination at Step S1307 shown in FIG. 13 when the different characters are continuous. The application of the information input to the allowable number-of-continuous-different-characters input section 143 is explained later.

The similar-character-allowable-level specifying section 144 is a section for determining that a different character having a similar form is not counted as a different character, i.e., determining an allowance of a similar character, which is indicated by four levels of "0", "1", "2", and "3". "0" indicates that a similar character is not allowed. "1" indicates that a character is not counted as a different character if the form of the character is extremely similar.

"2" indicates that a character having a similar form is not counted as a different character although the similarity is lower than the degree of "1". "3" indicates that a character is not counted as a different character if the form thereof has even a small similarity. The application of the information input to the similar-character-allowable-level specifying section 144 is explained later.

Figure 16:
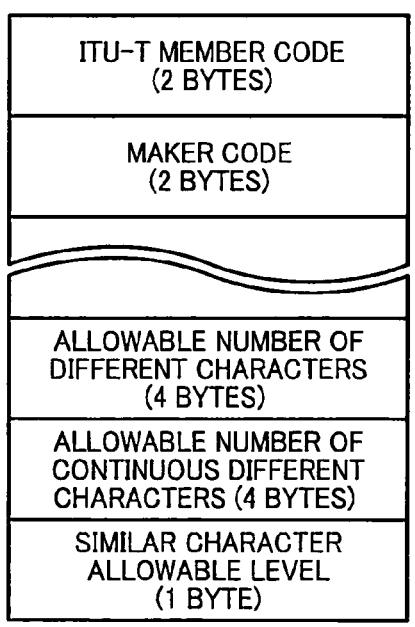
FIG. 16 is a diagram illustrating an example of information included in information that the MFP on the transmitting side transmits according to the second embodiment.

When information is input on the screen shown in FIG. 15, the operating unit 504 obtains allowable number-of-different-characters information, allowable number-of-continuous-different-characters information, and information on the allowable level of a similar character at Step S801 shown in FIG. 8. Such information is obtained, so that the NSS command transmitted by the image transmitting unit 502 in the present embodiment at Step S808 shown in FIG. 8 includes information as shown in FIG. 16 in addition to the information shown in FIG. 11.

Next, the processing in the MFP that receives an image is explained. The processing when the MFP according to the present embodiment receives an image is almost the same as the processing explained in FIG. 13 except for the processing at Step S1307. The processing at Step S1307 according to the present embodiment is explained with reference to FIG. 17.

Figure 17:
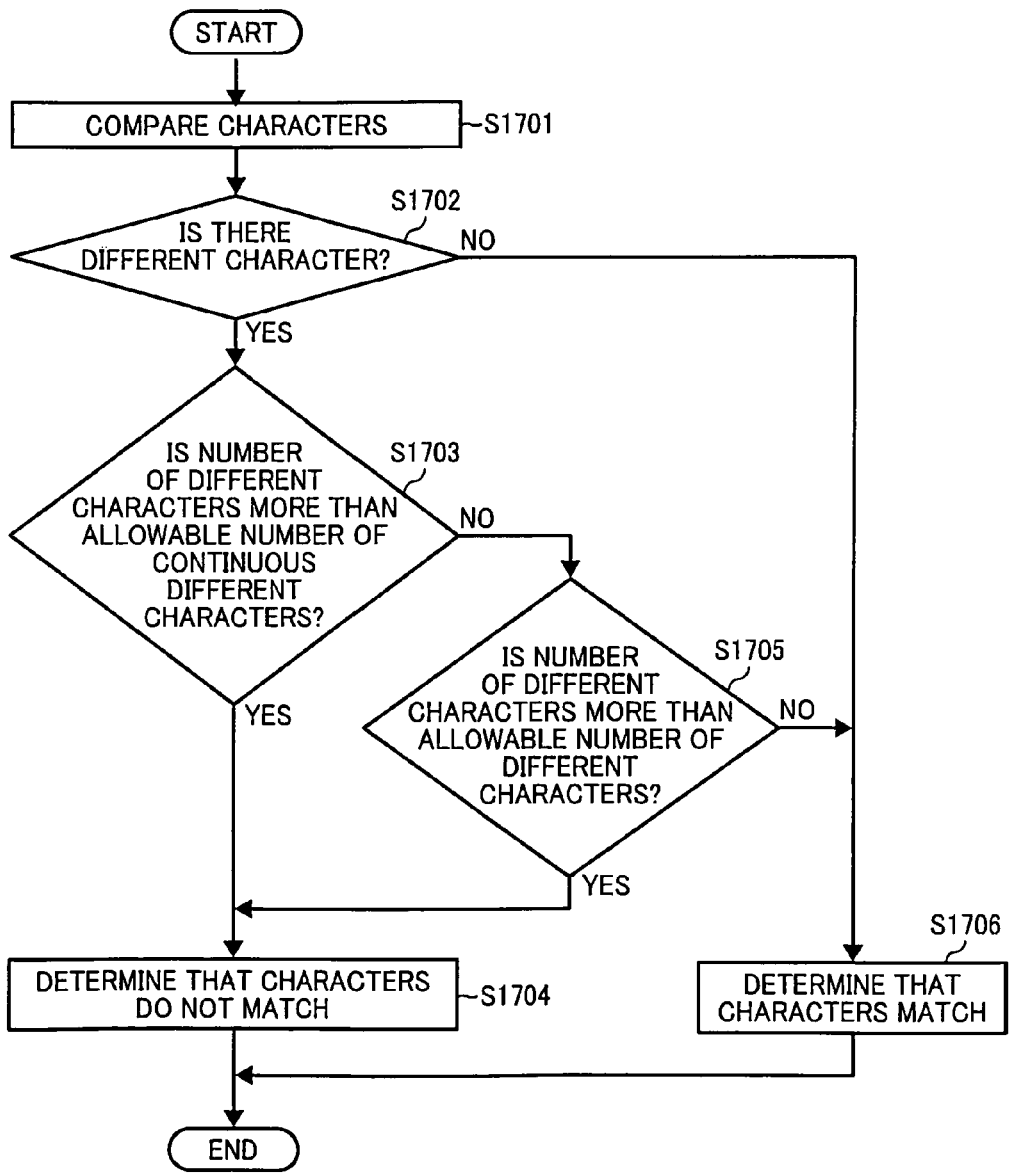
FIG. 17 is a diagram illustrating an operation in a character-string comparison according to the second embodiment.

FIG. 17 is a flowchart illustrating the processing corresponding to Step S1307 in the first embodiment according to the present embodiment. As shown in FIG. 17, in the similar manner to Step S1307 in the first embodiment, first, the character extracting unit 603 compares the character string of the specified character string shown in FIG. 11 with the character string recognized from the image data on the luminance component (Y) stored by the image scanning unit 608 (Step S1701). The character extracting unit 603 in the present embodiment stores therein information on a table as shown in FIG. 18.

Figures 18, 19:
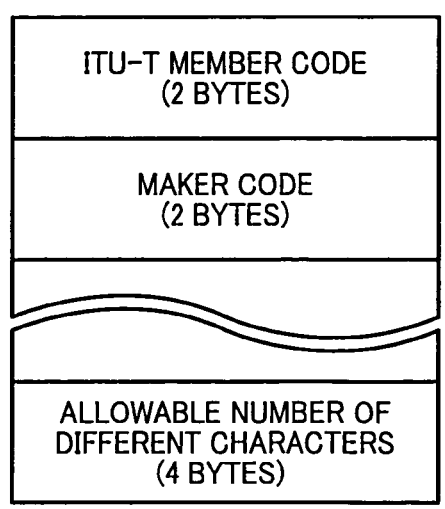
FIG. 18 is a diagram schematically illustrating an example of information stored in a character extracting unit in the MFP on the receiving side according to the second embodiment.
FIG. 19 is a diagram illustrating an example of information included in the NSS command that the MFP on the transmitting side transmits when transmitting a monochrome image according to the second embodiment.

In the table shown in FIG. 18, similar characters for respective characters are stored while being classified into the first group, the second group, and the third group depending on the similarity. For example, in a case of a Chinese character "日", a character corresponding to a similarity "1" is an alphabet "E", a Chinese character "曰", and the like, a character corresponding to a similarity "2" is alphabets "B" and "F", a Chinese character "田", and the like, and a character corresponding to a similarity "3" is an alphabet "A", a number "8", a Chinese character "且", and the like.

At Step S1701, the character extracting unit 603 refers to the table shown in FIG. 18 according to a similar character allowable level shown in FIG. 16, and compares character strings while taking an allowed similar character as the same character.

When there is no different character (No at Step S1702), the character extracting unit 603 determines that characters match (Step S1706), and the processing at Step S1307 ends. When there is a different character (Yes at Step S1706), the character extracting unit 603 determines whether the number of different characters is larger than the allowable number of continuous different characters shown in FIG. 16 (Step S1703).

When the number of different characters is larger the allowable number of continuous different characters (Yes at Step S1703), the character extracting unit 603 determines that the character strings do not match (Step S1704) and the processing at Step S1307 ends. When the number of different characters is equal to or smaller the allowable number of continuous different characters (No at Step S1703), the character extracting unit 603 determines whether the number of different characters is larger than the allowable number of different characters shown in FIG. 16 (Step S1705).

At Step S1705, when the allowable number of different characters is specified by the number of characters, the character extracting unit 603 compares the specified number of characters with the extracted number of different characters. On the other hand, when the allowable number of different characters is specified by a percentage, the character extracting unit 603 applies the specified percentage to the total number of characters recognized at Step S1306 and calculates the allowable number of different characters.

When the number of different characters is larger than the allowable number of different characters (Yes at Step S1705), the character extracting unit 603 determines that the character strings do not match (Step S1704), and the processing at Step S1307 ends. When the number of different characters is equal to or smaller than the allowable number of different characters (No at Step S1705), the character extracting unit 603 determines that the characters match (Step S1706), and the processing at Step S1307 ends.

As explained above, upon receiving an image, the MFP in the present embodiment does not take a perfect match of characters as a condition in the character comparison processing performed as the processing for determining whether to determine the color difference but performs the determination of the color difference in the similar manner to the case of the perfect match if the number of different characters is within the allowable range. Whereby, when a false recognition of a character occurs in the character recognition, the color difference determination is prevented from being canceled.

Moreover, in the present embodiment, as explained in FIG. 14, a transmitter specifies the allowable number of different characters, the allowable number of continuous different characters, the similar-character allowable level, and the like in the MFP on the transmitting side of an image. Whereby, the above embodiment can be realized without registering information in advance in the MFP on the receiving side of an image.

Furthermore, in the present embodiment, in the similar manner to the first embodiment, the information on the specified character string can be eliminated from the information shown in FIG. 1 by eliminating the processing at Step S801. In this case, the character extracting unit 603 binarizes the image data on the luminance component (Y) stored by the print-color converting unit 604 and performs the character string recognition in the similar manner to Step S1306 according to the coordinate information shown in FIG. 11. Then, at Step S1307, the character extracting unit 603 compares the character string recognized from the image data on the luminance component (Y) stored by the print-color converting unit 604 with the character string recognized from the image data on the luminance component (Y) stored by the image scanning unit 608. Even with this processing, the effect similar to the above can be obtained.

Moreover, in the present embodiment, explanation is given for the case where a color image is received at Step S1301; however, the present embodiment can be applied to the case of receiving a binary image, i.e., a monochrome image. In this case, the processing at Steps S1302 to S1307 shown in FIG. 13 becomes processing corresponding to a binary image. Moreover, it is possible to determine whether an image is correctly printed by the processing up to Step S1307 without performing the processing at Step S1308.

Figure 20:
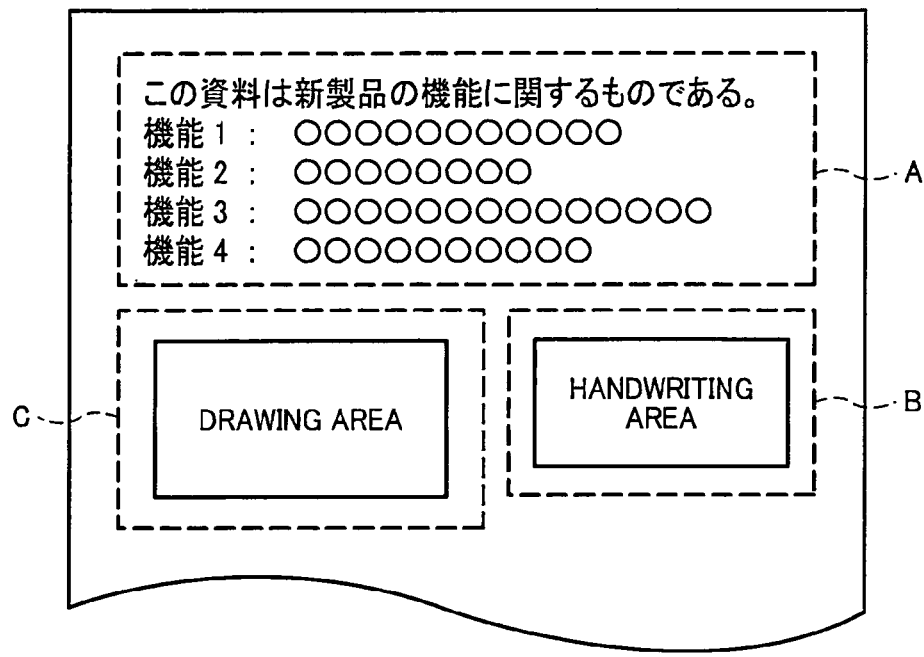
FIG. 20 is a diagram illustrating an example of an image transmitted when transmitting the monochrome image according to the second embodiment.

The case of receiving a monochrome image at Step S1301 is explained with reference to the drawings. In this case, the condition information for the image comparison is only the allowable number of different characters. An example of information included in the NSS command in this case is shown in FIG. 19. FIG. 20 is a diagram illustrating an example of a monochrome image received at Step S1301. When the MFP 103 receives an image as shown in FIG. 20, the MFP 103 first performs a tilt correction and a layout analysis on the received image and divides the image into blocks as indicated by dotted lines in FIG. 20.

As shown in FIG. 20, an example is given for the case where the image is divided into a block A that includes a type character, a block B that includes a handwriting character, and a block C that includes others (e.g., drawings). "O" in the block A represents an abstraction of a character. In the tilt correction and the block division, various known methods can be employed and detailed explanation thereof is omitted.

Figure 21:
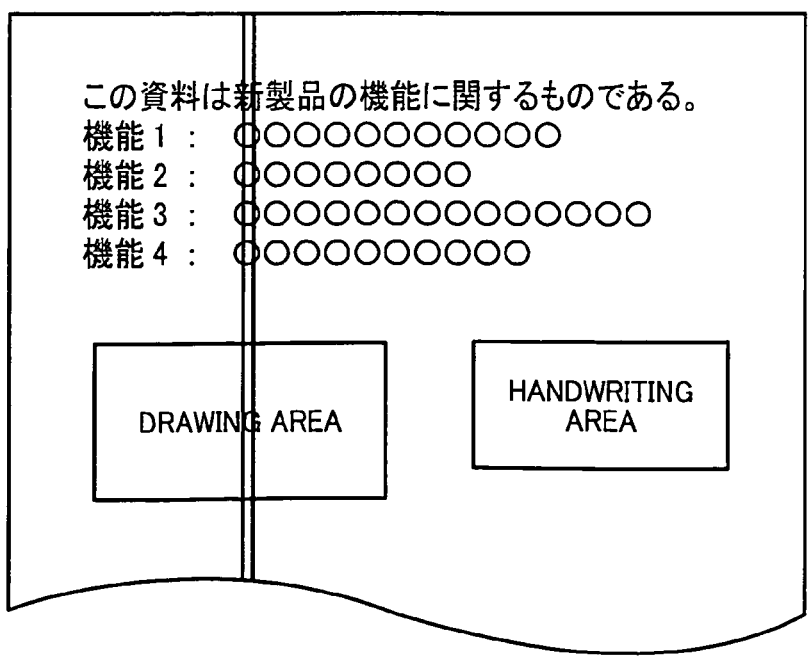
FIG. 21 is a diagram illustrating a scanned result of an image output when transmitting the monochrome image according to the second embodiment.

Next, the print output unit 606 prints the monochrome image on the sheet 303 by using the print engine 211 (corresponding to Step S1303), and the image scanning unit 608 scans the image printed on the sheet 303 by using the discharge scanner 212 (corresponding to Step S1304). In the printing by the print engine 211, as shown in FIG. 21, the image is printed with a vertical line drawn thereon as an example.

In this case, a character extracting unit 1703 recognizes characters in the first line in the block A as "this material relates to a function of a parent product." in Japanese (corresponding to Step S1306). Next, a character-difference determining unit 1705 compares the character string extracted from the received binary image data with the character string extracted from the binary image data scanned from the sheet 303 by an image scanning unit 1706 for each of the block A and the block B (corresponding to Step S1307).

Figures 22, 23:
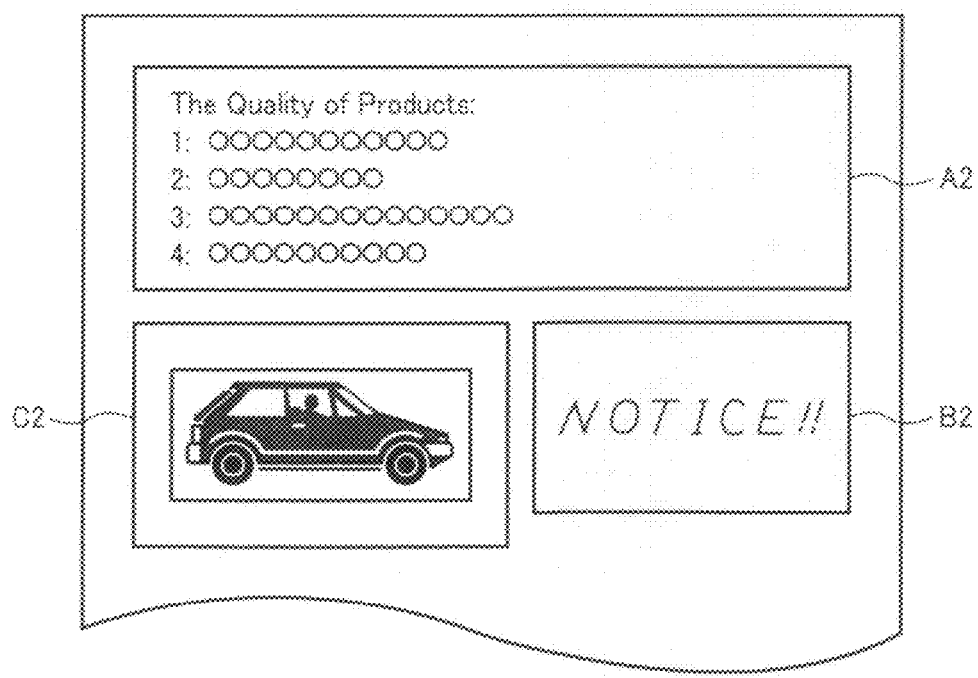
FIG. 22 is a diagram illustrating different characters in a comparison result when transmitting the monochrome image according to the second embodiment.
FIG. 23 is a diagram illustrating an example (second) in which a binary image is divided into blocks by a layout analysis according to the second embodiment.

In FIG. 22, different characters in the block A as a result of the comparison are represented by surrounding them by a frame. In this case, five characters are different. In the block B, there is no different character. Next, the character-difference determining unit 1705 determines whether the number of different characters is equal to or lower than the allowable number of different characters shown in FIG. 19 (corresponding to Step S1705). When the allowable number of different characters is three, because the number of different characters is larger than the allowable number of different characters, the message transmitting unit 610 transmits a message indicating that there is a problem in quality of the print image printed on the sheet 303 to the MFP 106 as a transmission source terminal (corresponding to Step S1314).

Figures 24, 25:
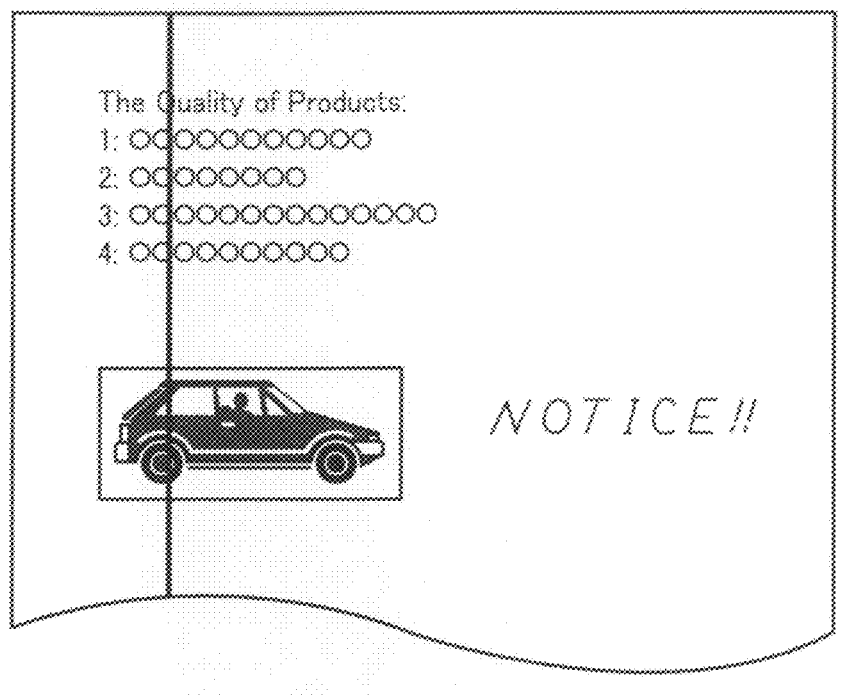
FIG. 24 is a diagram illustrating an example (second) in which a problem occurs when the binary image is output according to the second embodiment.
FIG. 25 is a diagram (second) illustrating different characters in a comparison result of character strings according to the second embodiment.

FIG. 23 to FIG. 25 are diagrams illustrating an example of an image including an English sentence. FIG. 23 is a diagram illustrating an example in which the character extracting unit 603 divides the image into blocks by a layout analysis. In FIG. 23, a block A2 is a block that includes a type character, a block B2 is a block that includes a handwriting character, and a block C2 is a block that includes others. "O" in the block A2 represents an abstraction of a character.

FIG. 24 is a diagram illustrating an example in which the image is printed with a vertical line drawn thereon in the similar manner to FIG. 21. In this case, the character extracting unit 603 recognizes characters in the first line in the block A2 as "The Ouality of Products:".

FIG. 25 is a diagram illustrating different characters as a result of the comparison by surrounding them by a frame in the block A2 in the similar manner to FIG. 22. In the FIG. 25 also, five characters are different. In the block B2, there is no different character. Then, the character extracting unit 603 performs the processing at Steps S1703 and S1705.

In a third embodiment, a difference between a received image and a printed image is determined when there is a missing portion or a stain in the image printed on the sheet 303.

Figure 26:
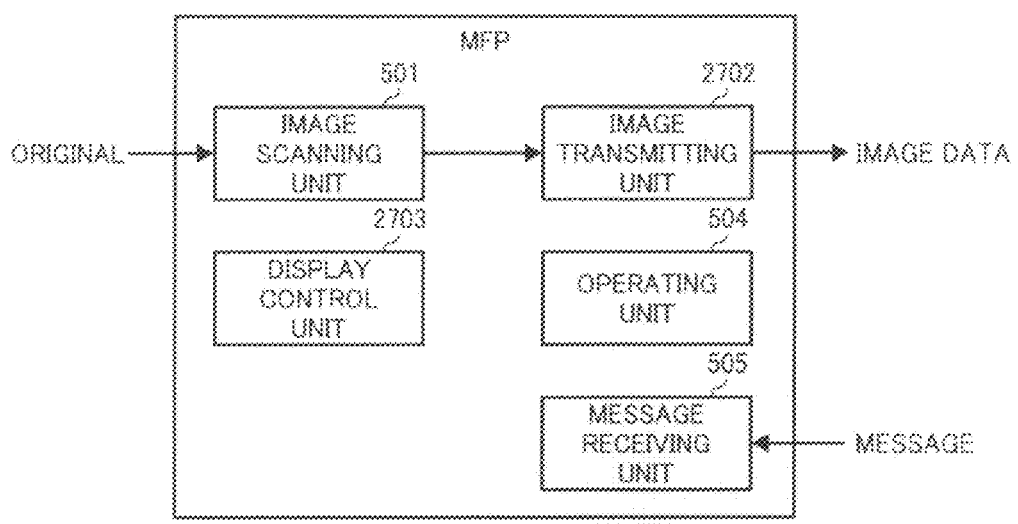
FIG. 26 is a functional configuration diagram when the MFP functions as a transmitter according to a third embodiment.

First, the processing in the MFP 106 that transmits a color image in the present embodiment is explained. FIG. 26 is a functional configuration diagram when the MFP according to the third embodiment functions as a transmitter. As shown in FIG. 26, the MFP 106 according to the present embodiment mainly includes the image scanning unit 501, an image transmitting unit 2702, a display control unit 2703, the operating unit 504, and the message receiving unit 505. The function and the configuration of the image scanning unit 501, the operating unit 504, and the message receiving unit 505 are similar to those of the MFP 106 in the first embodiment.

When a transmitter sets an original on the original scanner 208 and selects a button for specifying an allowable level of a shape difference of an image displayed on the LCD 217, the display control unit 2703 in the present embodiment displays an allowable-level specifying screen of the shape difference of the image.

Figure 27:
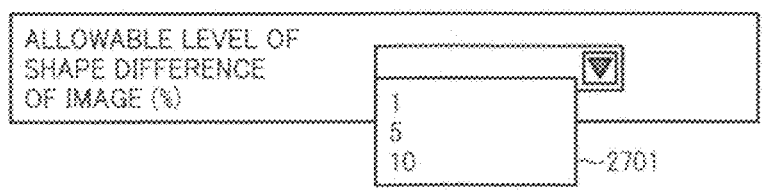
FIG. 27 is a schematic diagram illustrating an example of the GUI of an allowable-level specifying screen according to the third embodiment.

FIG. 27 is a schematic diagram illustrating an example of the GUI of the allowable-level specifying screen according to the third embodiment. As shown in FIG. 27, the GUI of the allowable-level specifying screen according to the present embodiment includes an allowable-level specifying section 2701. In the allowable-level specifying section 2701, numerical values "1", "5", and "10" are preset as a percentage (%).

Figure 28:
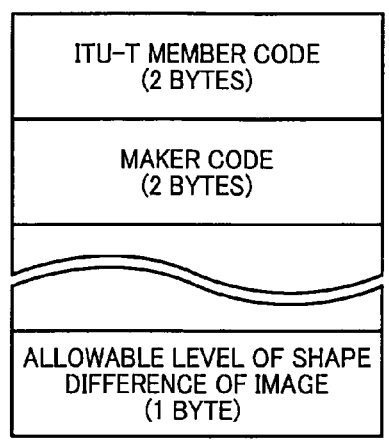
FIG. 28 is an explanatory diagram illustrating an example of the NSS command according to the third embodiment.

A transmitter can specify the allowable level by selecting the preset numerical value. When the transmitter selects the allowable level, the operating unit 504 obtains information on the allowable level. Then, when the transmitter specifies a transmission destination and presses a start button, the image transmitting unit 2702 transmits JPEG-encoded image data to the MFP 103 by the communication procedure shown in FIG. 7 together with the allowable level of the shape difference of the image, and the processing ends. The image transmitting unit 2702 transmits the allowable level of the shape difference of the image while including it in the NSS command. FIG. 28 is an explanatory diagram illustrating an example of the NSS command according to the third embodiment. As shown in FIG. 28, the specified allowable level of the shape difference of the image is set in the last 1-byte field of the NSS command.

Figure 29:
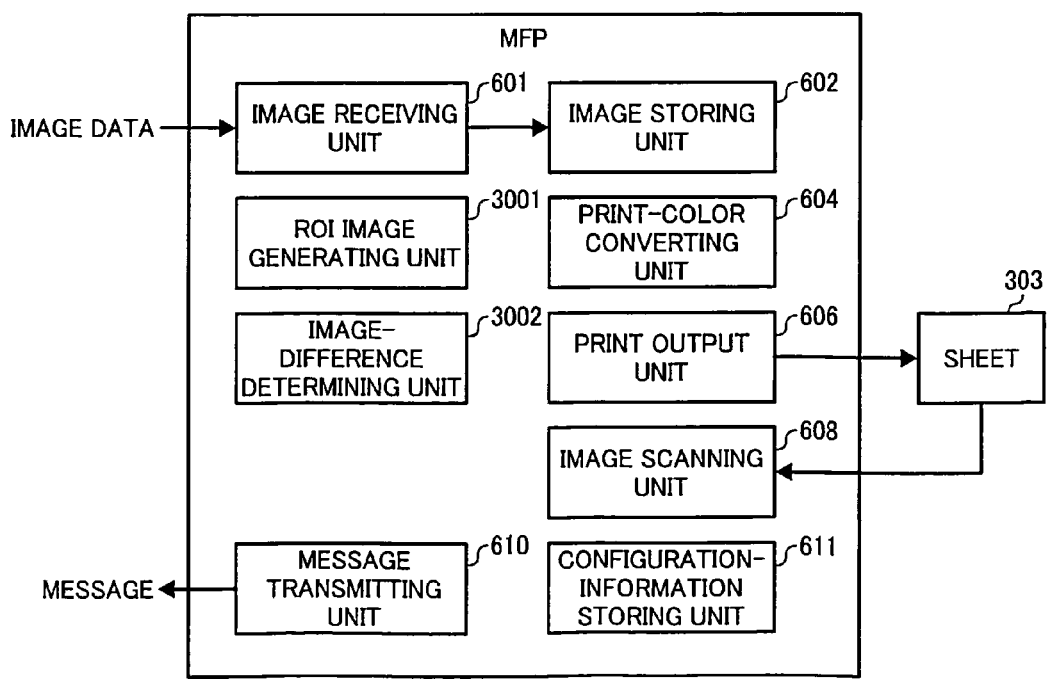
FIG. 29 is a block diagram illustrating a functional configuration of the MFP according to the third embodiment.

Next, explanation is given for the case where the MFP 103 according to the present embodiment functions as a receiver. FIG. 29 is a block diagram illustrating a functional configuration of the MFP 103 according to the third embodiment. As shown in FIG. 29, the MFP 103 according to the present embodiment mainly includes the image receiving unit 601, the image storing unit 602, a region-of-interest (ROI) image generating unit 3001, an image-difference determining unit 3002, the print-color converting unit 604, the print output unit 606, the image scanning unit 608, the configuration-information storing unit 611, and the message transmitting unit 610. The function and the configuration of the image receiving unit 601, the image storing unit 602, the print-color converting unit 604, the print output unit 606, the image scanning unit 608, the configuration-information storing unit 611, and the message transmitting unit 610 are similar to those of the MFP 103 in the first embodiment.

The ROI image generating unit 3001 generates a ROI (REGION-OF INTEREST) candidate image from RGB image data for one page and further generates a ROI image from the ROI candidate image.

The ROI image is an image indicating a region of interest including a defective portion, and the ROI candidate image is an image that is generated at a stage prior to the ROI image and indicates an area to be a candidate for a region of interest. In the present embodiment, a missing defect and a stain defect are detected by using the ROI image and the ROI candidate image. Moreover, in the present embodiment, a method described in Japanese Patent Application Laid-open No. 2005-205748 is used for generating the ROI image and the ROI candidate image.

The ROI image and the ROI candidate image are generated by the ROI image generating unit 3001 by the following manner. With RGB image data converted from the JPEG image data received from the MFP 106 as a reference image, the RGB image data is converted into YMCK image data to be printed on the sheet 303, and RGB image data obtained by scanning the sheet 303 is used as an inspection image.

The ROI image generating unit 3001 divides each of the reference image and the inspection image into an R component, a G component, and a B component, and neighborhood-minimum-value selection/difference processing is performed to generate a neighborhood-minimum-value selection/difference image for each component. Then, the RGB components of the neighborhood-minimum-value selection/difference images are synthesized, which is subjected to MAX processing to generate the ROI candidate image.

Then, the ROI image generating unit 3001 generates the ROI image by performing dynamic binarization processing, line-thickening processing, and labeling processing on the generated ROI candidate image. The dynamic binarization processing is processing for binarizing the entire screen by obtaining a threshold for each block after dividing the image into a plurality of rectangular areas (blocks) with a predetermined size.

A method described in Japanese Patent Application Laid-open No. 2005-205748 (paragraphs 0040-0049) is used for details of the neighborhood-minimum-value selection/difference processing and the labeling processing.

The image-difference determining unit 3002 detects the missing defect and the stain defect of an image by using the ROI image and the ROI candidate image. Specifically, the image-difference determining unit 3002 detects the missing defect and the stain defect by determining whether a difference between image data received from the MFP 106 and image data obtained by scanning an image printed on the sheet 303 by the image scanning unit 608 is within the range of the allowable level of the shape difference of the image received from the MFP 106 by using the ROI image and the ROI candidate image. In the present embodiment, a method described in Japanese Patent Application Laid-open No. 2005-205748 (paragraphs 0050-0058) is used for the detection of the missing defect and the stain defect by using the ROI image and the ROI candidate image. However, the method is not limited thereto, and the detection of the missing defect and the stain defect can be performed by any method.

Figure 30A:
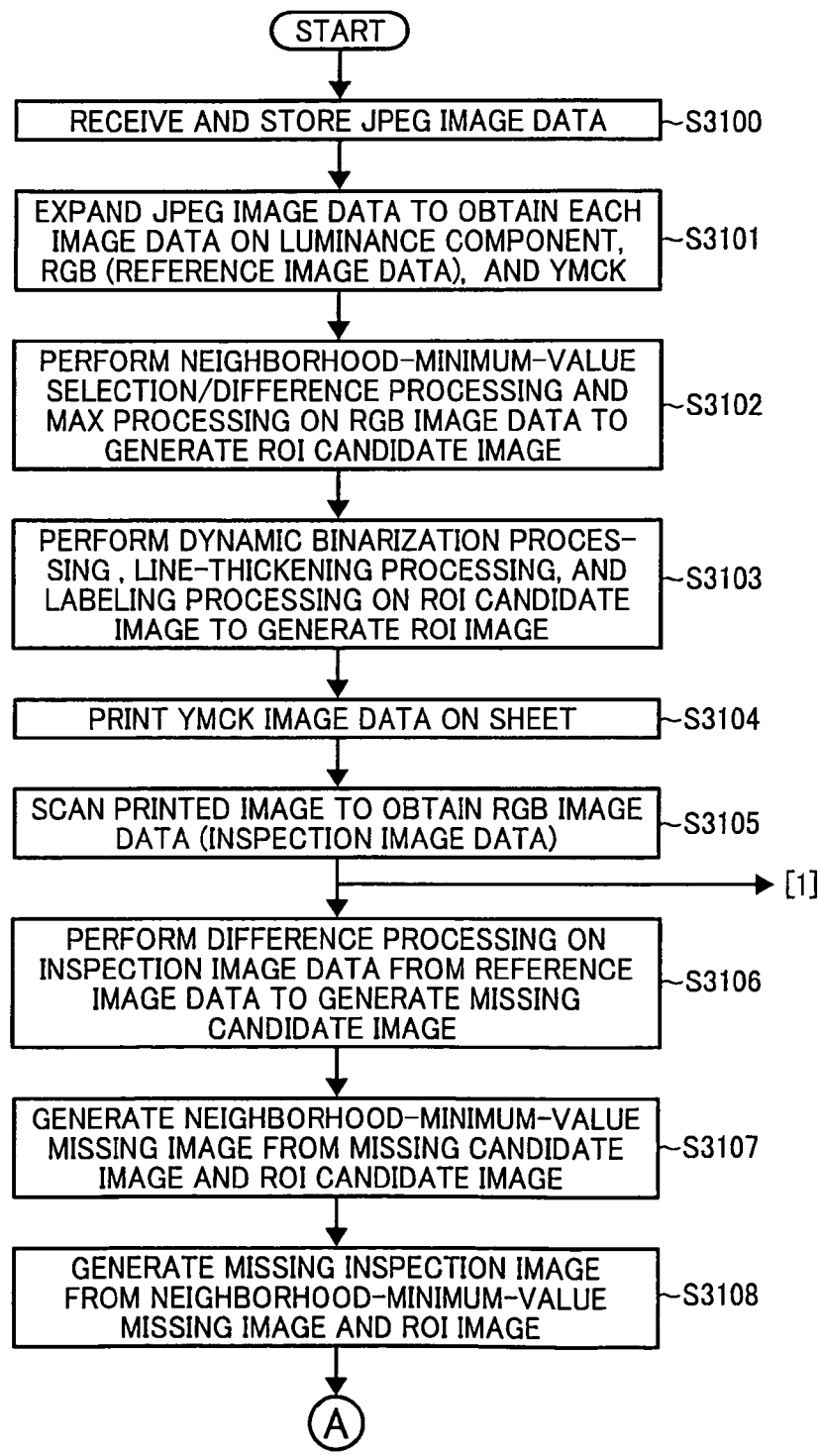
FIG. 30 is a flowchart illustrating a procedure of processing (missing defect detection) for a defect detection of color image data after receiving the color image data according to the third embodiment.
Figure 30B:
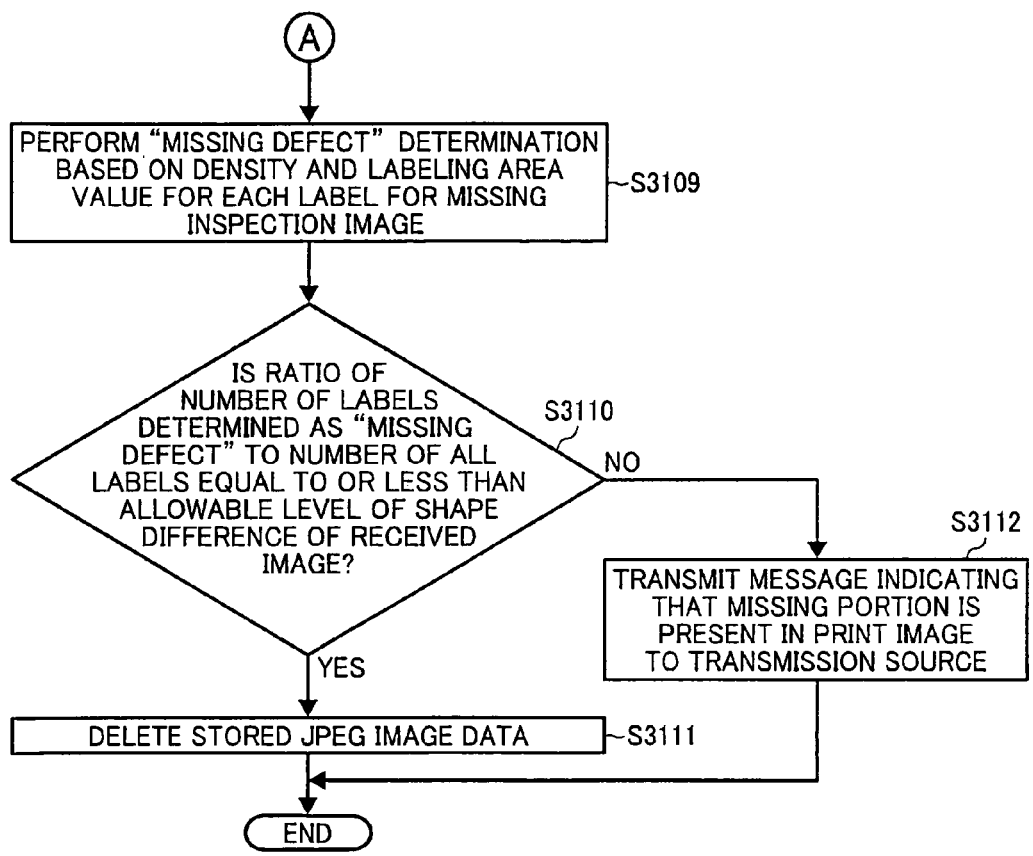
Figure 31:
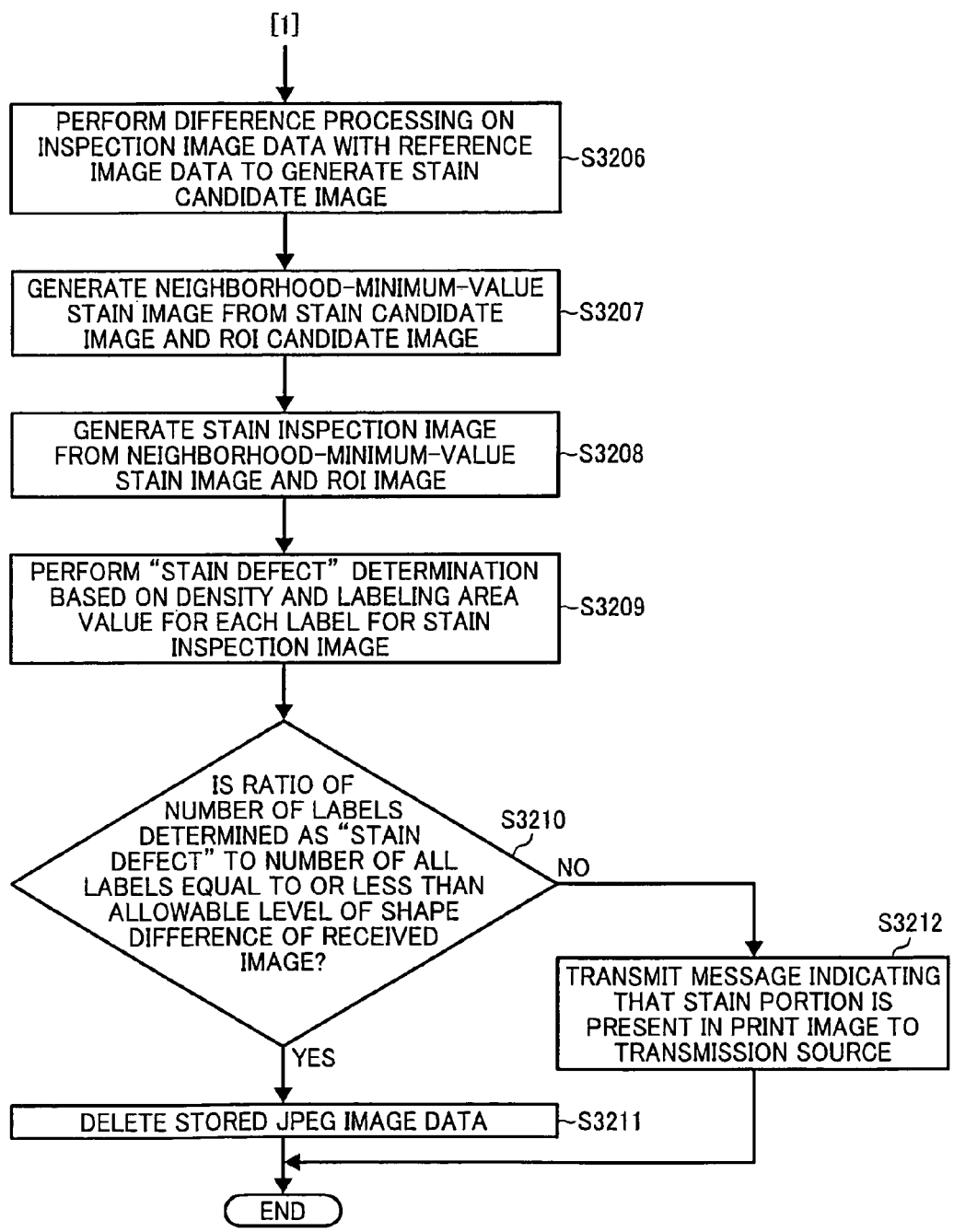
FIG. 31 is a flowchart illustrating a procedure of processing for a stain defect detection according to the third embodiment.
Figure 32:
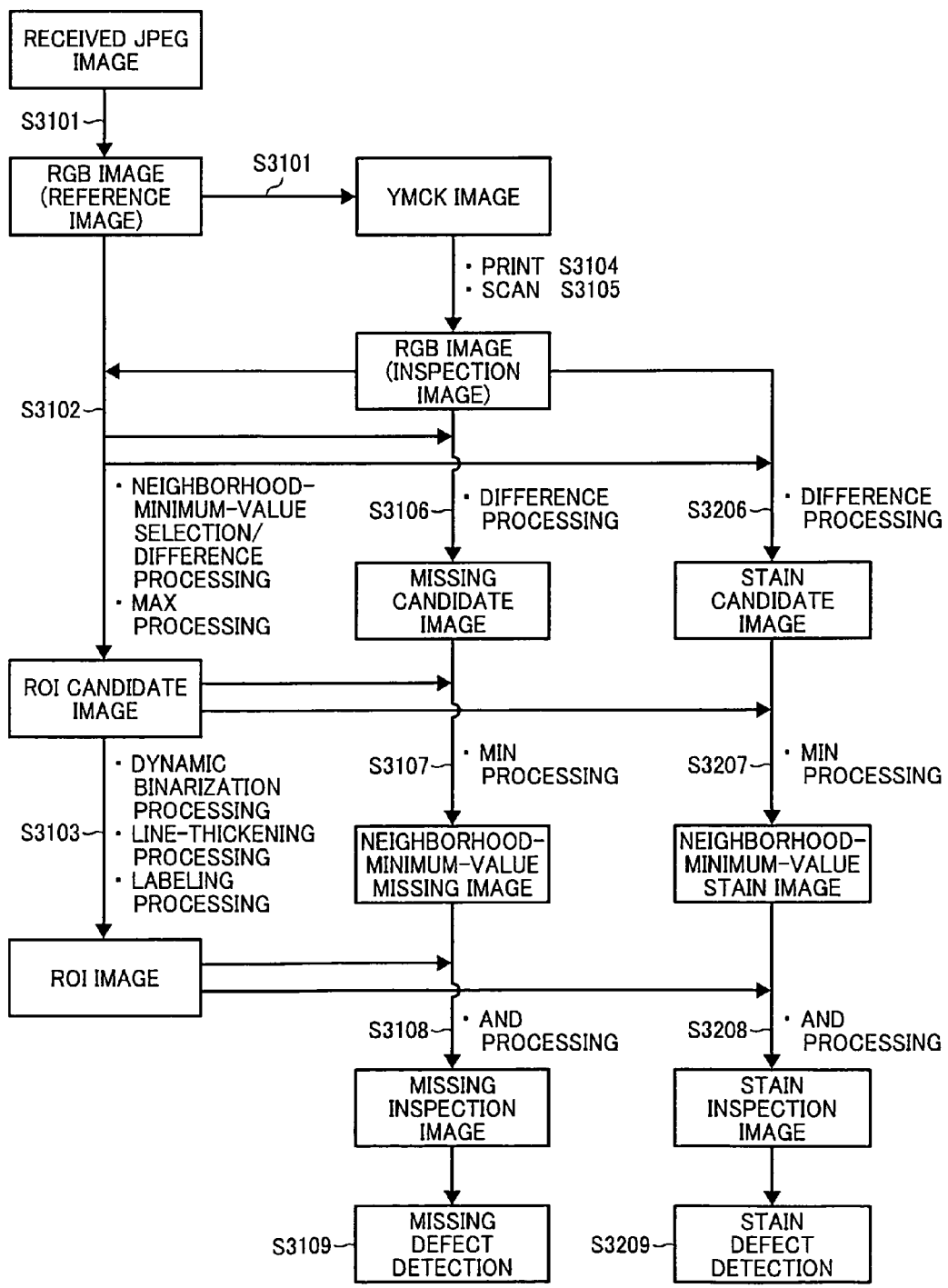
FIG. 32 is an explanatory diagram illustrating a flow of processing up to a defect determination of the color image data mainly from the viewpoint of an image to be generated according to the third embodiment.

Next, explanation is given for the operation by the MFP 103 in the present embodiment configured as above when receiving color image data transmitted from the MFP 106. FIGS. 30 and 31 are flowcharts illustrating a procedure of processing for a defect determination of color image data after receiving the color image data. FIG. 32 is an explanatory diagram illustrating a flow of processing up to the defect determination of color image data mainly from the viewpoint of an image to be generated.

In the present embodiment, the missing defect and the stain defect of image data are detected. In the MFP 103, when the image receiving unit 601 receives JPEG image data transmitted from the MFP 106, the image storing unit 602 stores the received JPEG image data in the HD 214 (Step S3100). The MFP 103 also receives the NSS command shown in FIG. 28 at Step S3100.

Next, the print-color converting unit 604 performs the expansion (decoding) processing conforming to JPEG on the JPEG image data stored in the HD 214 to convert the image data separated into the color difference component (Cb, Cr) and the luminance component (Y) into RGB image data and convert the RGB image data into print image data of yellow (Y), magenta (M), cyan (C), and black (K) (Step S3101). At this time, the print-color converting unit 604 stores the generated RGB image data in the main memory 203 as the reference image data.

Next, the ROI image generating unit 3001 performs the neighborhood-minimum-value selection/difference processing and the MAX processing on this RGB image data to generate the ROI candidate image (Step S3102). Then, the ROI image generating unit 3001 performs the dynamic binarization processing, the line-thickening processing, and the labeling processing on this ROI candidate image to generate the ROI image (Step S3103).

Next, the print output unit 606 prints the image data converted into YMCK on the sheet 303 by using the print engine 211 (Step S3104).

Next, when the sheet 303 on which the image data is printed passes the discharge port, the image scanning unit 608 scans the image printed on the sheet 303 by using the discharge scanner 212 to obtain RGB image data (Step S3105). Then, this RGB image data is used as the inspection image data.

Next, the missing defect determination is explained. Upon scanning the RGB image data as the inspection image data, the image-difference determining unit 3002 performs the difference processing on the RGB image data as the inspection image data from the RGB image data as the reference image for each of the RGB components of the RGB image data, synthesizes the RGB components, and performs the MAX processing to generate a missing candidate image (Step S3106). The difference processing is performed in a saturation mode, and when the result of the difference is negative (minus), it is clipped to zero.

Next, the image-difference determining unit 3002 performs MIN processing with the missing candidate image and the ROI candidate image to generate a neighborhood-minimum-value missing image (Step S3107).

Next, the image-difference determining unit 3002 performs AND processing on the neighborhood-minimum-value missing image and the ROI image to generate a missing inspection image (Step S3108).

Figure 33:
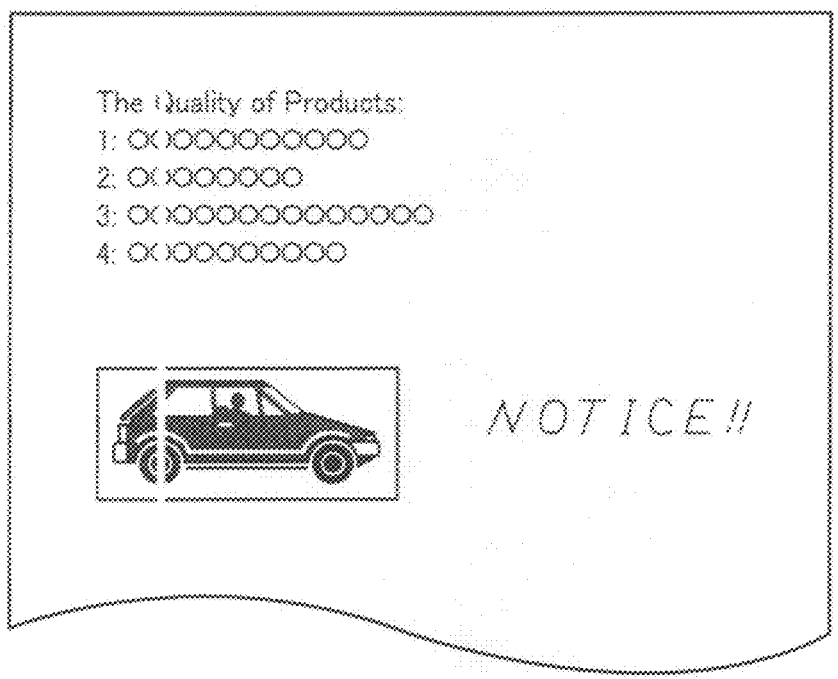
FIG. 33 is a diagram illustrating a print example when a missing defect occurs in an image.

Next, the image-difference determining unit 3002 calculates an average density and a labeling area value of a ROI (minimum rectangular area) or a minimum rectangular area circumscribing the ROI for each label in the missing inspection image. When they are larger than a predetermined setting value, the label is determined as the "missing defect" (Step S3109). Then, the image-difference determining unit 3002 calculates a ratio of the number of labels determined as the "missing defect" to the number of all of the labels, and determines whether the ratio is within the allowable level of the shape difference of the image received from the MFP 106 (Step S3110). Then, when the ratio of the number of the labels determined as the "missing defect" exceeds the allowable level (No at Step S3110), the message transmitting unit 610 transmits a message indicating that a print image printed on the sheet 303 has a missing portion to the MFP 106 as a transmission source terminal (Step S3112). FIG. 33 is a diagram illustrating a print example when the missing defect occurs in an image.

On the other hand, when the ratio of the number of the labels determined as the "missing defect" is equal to or lower than the allowable level (Yes at Step S3110), it is determined that the print image does not have a missing defect, and the image storing unit 602 deletes JPEG image data stored in the HD 214 (Step S3111).

Next, the stain defect determination is explained. Upon scanning the RGB image data as the inspection image data at Step S3105, the image-difference determining unit 3002 performs the difference processing on the RGB image data as the inspection image with the RGB image data as the reference image data for each of the RGB components of the RGB image data, synthesizes the RGB components, and performs the MAX processing to generate a stain candidate image (Step S3206).

Next, the image-difference determining unit 3002 performs the MIN processing with the stain candidate image and the ROI candidate image to generate a neighborhood-minimum-value stain image (Step S3207).

Next, the image-difference determining unit 3002 performs the AND processing on the neighborhood-minimum-value stain image and the ROI image to generate a stain inspection image (Step S3208).

Next, the image-difference determining unit 3002 calculates the average density and the labeling area value of a ROI or a minimum rectangular area circumscribing the ROI for each label in the stain inspection image. When they are larger than a predetermined setting value, the label is determined as the "stain defect" (Step S3209). Then, the image-difference determining unit 3002 calculates a ratio of the number of labels determined as the "stain defect" to the number of all of the labels, and determines whether the ratio is within the allowable level of the shape difference of the image received from the MFP 106 (Step S3210). Then, when the ratio of the number of the labels determined as the "stain defect" exceeds the allowable level (No at Step S3210), the message transmitting unit 610 transmits a message indicating that a print image printed on the sheet 303 has a stain portion to the MFP 106 as a transmission source terminal (Step S3212).

On the other hand, when the ratio of the number of the labels determined as the "stain defect" is equal to or lower than the allowable level (Yes at Step S3210), it is determined that the print image does not have a stain defect, and the image storing unit 602 deletes JPEG image data stored in the HD 214 (Step S3211).

In this manner, in the present embodiment, it is possible to check whether there is a defect, i.e., a missing portion and a stain, on an image printed on the side of the MFP 103, so that reliability of the MFPs 103 and 106 can be improved.

Each function described above can be realized by a computer-executable program written in a legacy programming language such as assembler, C, C++, C#, and Java (registered trademark), an object-oriented programming language, or the like. The computer-executable program can be stored in a recording medium readable by the apparatus, such as a ROM, an electrically erasable programmable read-only memory (EEPROM), an erasable programmable read-only memory (EPROM), a flash memory, a flexible disk, a compact disc ROM (CD-ROM), a compact disc rewritable (CD-RW), a digital versatile disc (DVD), a secure digital (SD) card, and a magneto-optical (MO) disc, for distribution.

According to an aspect of the present invention, a transmitter can check the quality of an image printed by a receiving side apparatus. Thus, reliability of an image communication apparatus is improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image communication apparatus that includes an image-data receiving unit that receives image data, a storing unit that stores therein the image data received by the image-data receiving unit, and an output unit that outputs the image data stored in the storing unit, the image communication apparatus comprising:
   a scanning unit configured to scan the image data output by the output unit;
   a difference extracting unit configured to extract a difference between the image data scanned by the scanning unit and the image data stored in the storing unit;
   a difference determining unit configured to determine whether the difference extracted by the difference extracting unit satisfies a predetermined condition based on condition information obtained together with the image data; and
   a control unit configured to control transmission of a message to a transmission source of the image data based on a result determined by the difference determining unit;
   wherein the difference extracting unit is further configured to extract a color difference, and wherein the condition information includes information specifying a hue range, and the difference extracting unit is further configured to extract the color difference when an image included in the image data stored in the storing unit belongs to the hue range specified in the predetermined condition.

2. The image communication apparatus according to claim 1, wherein
the control unit transmits a message indicating that output image data is different from received image data to the transmission source of the image data, when the difference determining unit determines that the predetermined condition is not satisfied.

3. The image communication apparatus according to claim 1, wherein
the condition information includes information specifying at least one of a plurality of ranges obtained by dividing a whole hue range as information specifying the hue range.

4. The image communication apparatus according to claim 1, wherein
the condition information includes information specifying at least one of ranges of red, blue, green, and yellow obtained by dividing a whole hue range as information specifying the hue range.

5. The image communication apparatus according to claim 1, wherein
the condition information includes a numerical value specifying a degree of the color difference,
the difference extracting unit is configured to extract the color difference by calculating a numerical value of the color difference between scanned image data and the image data stored in the storing unit, and
the difference determining unit is configured to perform determination by comparing calculated numerical value of the color difference with the numerical value specifying the degree of the color difference specified in the predetermined condition.

6. The image communication apparatus according to claim 1, wherein
the condition information includes information on a model of an apparatus that transmits the image data, and
the difference determining unit is configured to store therein information on a numerical value specifying a degree of the color difference that is set in accordance with the information on the model, and is configured to perform determination by comparing a numerical value of the color difference between scanned image data and the image data stored in the storing unit with the numerical value specifying the degree of the color difference in accordance with the information on the model.

7. The image communication apparatus according to claim 1, further comprising:
a character-string extracting unit configured to extract character strings from the image data scanned by the scanning unit and the image data stored in the storing unit; and
a character-string determining unit configured to determine a difference between two character strings extracted from scanned image data and stored image data by the character-string extracting unit, wherein
the condition information is information for determining the difference between the two character strings.

8. The image communication apparatus according to claim 7, wherein
the condition information includes information indicating a predetermined range of the difference of the character strings.

9. The image communication apparatus according to claim 8, wherein
the condition information includes allowable number-of-different-characters specifying information specifying a range of number of different characters in characters included in a character string as the information indicating the predetermined range, and
the character-string determining unit is configured to determine the number of different characters between the two character strings as the difference between the two character strings.

10. The image communication apparatus according to claim 8, wherein
the condition information includes allowable number-of-continuous-different-characters specifying information specifying a range of number of continuous different characters in characters included in a character string as the information indicating the predetermined range, and
the character-string determining unit is configured to determine the number of continuous different characters between the two character strings as the difference between the two character strings.

11. The image communication apparatus according to claim 8, wherein
the condition information includes information specifying that two characters, which are different and of which form is similar, are determined to be same character, as the information indicating the predetermined range, and
the character-string determining unit is configured to determine whether or not the two characters, which are different between the two character strings, are same character when the form of the two characters is similar.

12. The image communication apparatus according to claim 1, wherein
the condition information includes information specifying an image range in the image data, and
the image communication apparatus further comprises
a character-string extracting unit configured to extract character strings from the image data scanned by the scanning unit and the image data stored in the storing unit based on the information specifying the image range;
a character-string determining unit configured to determine a difference between two character strings extracted from scanned image data and stored image data by the character-string extracting unit; and
an image-area cutout unit configured to cut out a predetermined image area including a character string in which determined difference is within a predetermined range, wherein
the difference extracting unit is configured to extract the difference in the image area cut out by the image-area cutout unit.

13. The image communication apparatus according to claim 1, wherein
the condition information includes information specifying an image range and information on a character string in the image data, and the image communication apparatus further comprises
a character-string extracting unit configured to extract a character string from the image data scanned by the scanning unit based on the information specifying the image range;
a character-string determining unit configured to determine a difference between two character strings of the character string extracted by the character-string extracting unit and of the character string included in the predetermined condition information; and
an image-area cutout unit configured to cut out a predetermined image area including a character string in which determined difference is within a predetermined range, wherein
the difference extracting unit is configured to extract a difference in the image area cut out by the image-area cutout unit.

14. The image communication apparatus according to claim 1, wherein
the difference extracting unit is configured to extract an image, and
the difference determining unit is configured to determine whether a shape difference extracted by the difference extracting unit satisfies the predetermined condition based on the condition information obtained together with the image data.

15. The image communication apparatus according to claim 1, wherein
when the difference determining unit determines that the predetermined condition is satisfied, the control unit is configured to control deletion of the image data stored in the storing unit.

16. The image communication apparatus according to claim 1, further comprising an image-data transmitting unit that transmits image data that is to be received by the image-data receiving unit, wherein
the image-data transmitting unit includes
an image-data input unit from which image data to be transmitted is input,
a condition-information obtaining unit configured to obtain the condition information in accordance with an operation by a user, and
the image-data transmitting unit configured to transmit obtained image data and the condition information.

17. An image communication system that transmits and receives image data via a network, the image communication system comprising:
an image-data input unit through which image data to be transmitted and received is input;
a condition-information obtaining unit configured to obtain condition information on a difference condition for determining a difference between image data obtained by scanning an image output based on the image data and the image data in an apparatus that receives the image data, in accordance with an operation by a user;
an image-data transmitting unit configured to transmit obtained image data and the condition information;
an image-data receiving unit configured to receive transmitted image data;
a storing unit configured to store therein the image data received by the image-data receiving unit;
an output unit configured to output the image data stored in the storing unit;
a scanning unit configured to scan the image data output by the output unit;
a difference extracting unit configured to extract a difference between the image data scanned by the scanning unit and the image data stored in the storing unit;
a difference determining unit configured to determine whether the difference extracted by the difference extracting unit satisfies a predetermined condition based on the condition information obtained together with the image data; and
a control unit configured to control transmission of a message, to a transmission source of the image data, based on a result determined by the difference determining unit.

18. A non-transitory control program for causing an information processing apparatus to operate as an image communication apparatus that receives image data via a network, the control program causing the information processing apparatus to execute:
receiving image data;
storing received image data;
outputting stored image data;
scanning output image data that is output at the outputting;
extracting a difference between scanned image data and the stored image data;
determining whether extracted difference satisfies a predetermined condition based on condition information obtained together with the image data; and
transmitting a message to a transmission source of the image data based on determined result that is determined at the determining;
wherein the extracting extracts a color difference, and
wherein the condition information includes information specifying a hue range, and the extracting extracts the color difference when an image included in the image data stored in the storing belongs to the hue range specified in the predetermined condition.

* * * * *